US012587801B2

(12) United States Patent
Hockman

(10) Patent No.: US 12,587,801 B2
(45) Date of Patent: Mar. 24, 2026

(54) RE-MIXING A COMPOSITE AUDIO PROGRAM FOR PLAYBACK WITHIN A REAL-WORLD VENUE

(71) Applicant: Sphere Entertainment Group, LLC, New York, NY (US)

(72) Inventor: Erik Hockman, New York, NY (US)

(73) Assignee: Sphere Entertainment Group, LLC, New York, NY (US)

( * ) Notice: Subject to any disclaimer, the term of this patent is extended or adjusted under 35 U.S.C. 154(b) by 223 days.

(21) Appl. No.: 18/585,594

(22) Filed: Feb. 23, 2024

(65) Prior Publication Data

US 2024/0298129 A1 Sep. 5, 2024

Related U.S. Application Data

(60) Provisional application No. 63/449,797, filed on Mar. 3, 2023.

(51) Int. Cl.
*H04S 7/00* (2006.01)
*G10L 25/51* (2013.01)
(Continued)

(52) U.S. Cl.
CPC ............... *H04S 7/30* (2013.01); *G10L 25/51* (2013.01); *G11B 27/10* (2013.01); *H04R 3/12* (2013.01);
(Continued)

(58) Field of Classification Search
None
See application file for complete search history.

(56) References Cited

U.S. PATENT DOCUMENTS

| 2016/0071526 A1 | 3/2016 | Wingate |
| 2016/0073215 A1 | 3/2016 | Josephus |
(Continued)

FOREIGN PATENT DOCUMENTS

JP 2018091647 A 6/2018

OTHER PUBLICATIONS

International Search Report and Written Opinion issued in PCT/US2024/018094 dated Oct. 7, 2024, 46 pages.

*Primary Examiner* — Duc Nguyen
*Assistant Examiner* — Assad Mohammed
(74) *Attorney, Agent, or Firm* — Sterne, Kessler, Goldstein & Fox P.L.L.C.

(57) ABSTRACT

Systems, methods, and apparatuses can playback a composite audio program that is associated with an event being hosted by a real-world venue. These systems, methods, and apparatuses can seamlessly deconstruct the composite audio program into multiple audio sounds that can be collectively played back by the real-world venue. As part of this deconstruction, these systems, methods, and apparatuses can analyze the audio sounds to identify one or more characteristics, parameters, and/or attributes of these audio sounds. These systems, methods, and apparatuses can intelligently construct an audio presentation from these multiple audio sounds to playback the composite audio program within the real-world venue. As part of this construction, these systems, methods, and apparatuses construct the audio presentation based upon the one or more characteristics, parameters, and/or attributes of these audio sounds. After the constructing the audio presentation, these systems, methods, and apparatuses can configure the real-world venue as outlined in the audio presentation to playback the composite audio program within the real-world venue. As part of this constructing, these systems, methods, and apparatuses can iden-
(Continued)

Figure 1:

tify audio control signals that configure the real-world venue to playback the audio presentation through real-world loud-speakers within the real-world venue.

20 Claims, 17 Drawing Sheets

(51) Int. Cl.
*G11B 27/10* (2006.01)
*H04R 3/12* (2006.01)
*H04R 27/00* (2006.01)
*G10L 21/028* (2013.01)

(52) U.S. Cl.
CPC ............ *H04R 27/00* (2013.01); *G10L 21/028* (2013.01); *H04R 2227/007* (2013.01); *H04S 2400/11* (2013.01)

(56) References Cited

U.S. PATENT DOCUMENTS

2017/0193975 A1*  7/2017  Butts ................ G10K 11/17881
2019/0253826 A1   8/2019  Grosche
2021/0120358 A1*  4/2021  Elby ....................... H04S 7/303

* cited by examiner

100

102

106.1

106.i 156.1
156.n
158.1
158.i 156.1

156.n

AUDIO
RE-MIX
TOOL
154

AUDIO
DE-MIX
TOOL
152

150

156

158

156

158

104

150

150

400

402 — DECONSTRUCT AUDIO PROGRAM

404 — IDENTIFY ONE OR MORE CHARACTERISTICS, PARAMETERS, AND/OR ATTRIBUTES OF ONE OR MORE AUDIO SOURCES

1000

1002 — CONSTRUCT AUDIO PRESENTATION TO PLAYBACK A COMPOSITE AUDIO PROGRAM

1004 — CONFIGURE VENUE AS OUTLINED IN THE AUDIO PRESENTATION TO PLAYBACK THE COMPOSITE AUDIO PROGRAM

RE-MIXING A COMPOSITE AUDIO PROGRAM FOR PLAYBACK WITHIN A REAL-WORLD VENUE

CROSS-REFERENCE TO RELATED APPLICATIONS

The present application claims the benefit of U.S. Provisional Patent Application No. 63/449,797, filed Mar. 3, 2023, which is incorporated herein by reference in its entirety.

BACKGROUND

The comb filtering effect represents a phenomenon within a real-world venue that occurs when an audio sound and its reflections arrive at a location within the real-world venue at different instances in time. The audio sound can be reflected when it contacts hard surfaces, for example, a floor, a wall, a window, or the like within the real-world venue. Because the reflections travel a further distance than the audio sound, the reflection can arrive at the location later than the audio sound. Often times, specific frequencies of the audio sound are amplified or attenuated by the superposition its reflections onto itself causing the comb filtering effect. This superposition can cause certain cancellations and amplifications in the audio spectrum that can produce a subjectively metallic-like audio sound, also referred to as tinniness. Generally, when the time delay between the audio sound and its reflections is between approximately twenty (20) ms and thirty (30) ms, the human ear can undesirably perceive the audio sound and its reflections as separate signals. For example, when the time delay between the audio sound and its reflections is approximately fifty (50) ms, the human ear begins to perceive the reflections to be echoes of the audio sound, which are even more evident at approximately one hundred (100) ms. However, comb filtering effects can even be present when the time delay between the audio sound and its reflections is between approximately twelve (12) ms and approximately fifteen (15) ms. For example, the comb filtering effects can cause the timbre of the sound to be colored at the approximate twelve (12) ms delay between the audio sound and its reflections. And the comb filtering effects can cause the audio sound to be more "robotic" by increasing this increasing this delay between the audio sound and its reflections. In some situations, these comb filtering effects are not noticed when the time delay between the audio sound and its reflections is between approximately three (3) ms and approximately ten (10) ms.

Audio latency refers to time delay between when the audio sound is produced and when it arrives at a location within the real-world venue. In the context of the real-world venue, audio latency can be influenced by various factors including the distance between the audio source and the location within the real-world venue, the acoustics of the real-world venue, the processing and transmission of the audio sound, and the performance of any digital processing or effects on the audio sound. Often times, multiple audio sounds generated by multiple real-world loudspeakers in the real-world venue can reach a single location within the real-world venue at different instances in time. This can cause audio latency between these audio sounds within the real-world venue. Often times, when the audio latency between the multiple audio sounds is less than approximately ten (10) ms to approximately twelve (12) ms, the time delay between the multiple audio sounds will more than likely not be noticed. However, when the audio latency between the multiple audio sounds between approximately twenty (20) ms to approximately thirty (30) ms, the human ear can perceive these audio sounds as separate signals. For example, the audio latency can cause phasing, echo, or even a lack of synchronization between the multiple audio sounds. In live performances or audio production, managing audio latency between the multiple audio sounds is crucial to maintain a coherent and synchronized sound.

BRIEF DESCRIPTION OF THE DRAWINGS/FIGURES

Figure 2:
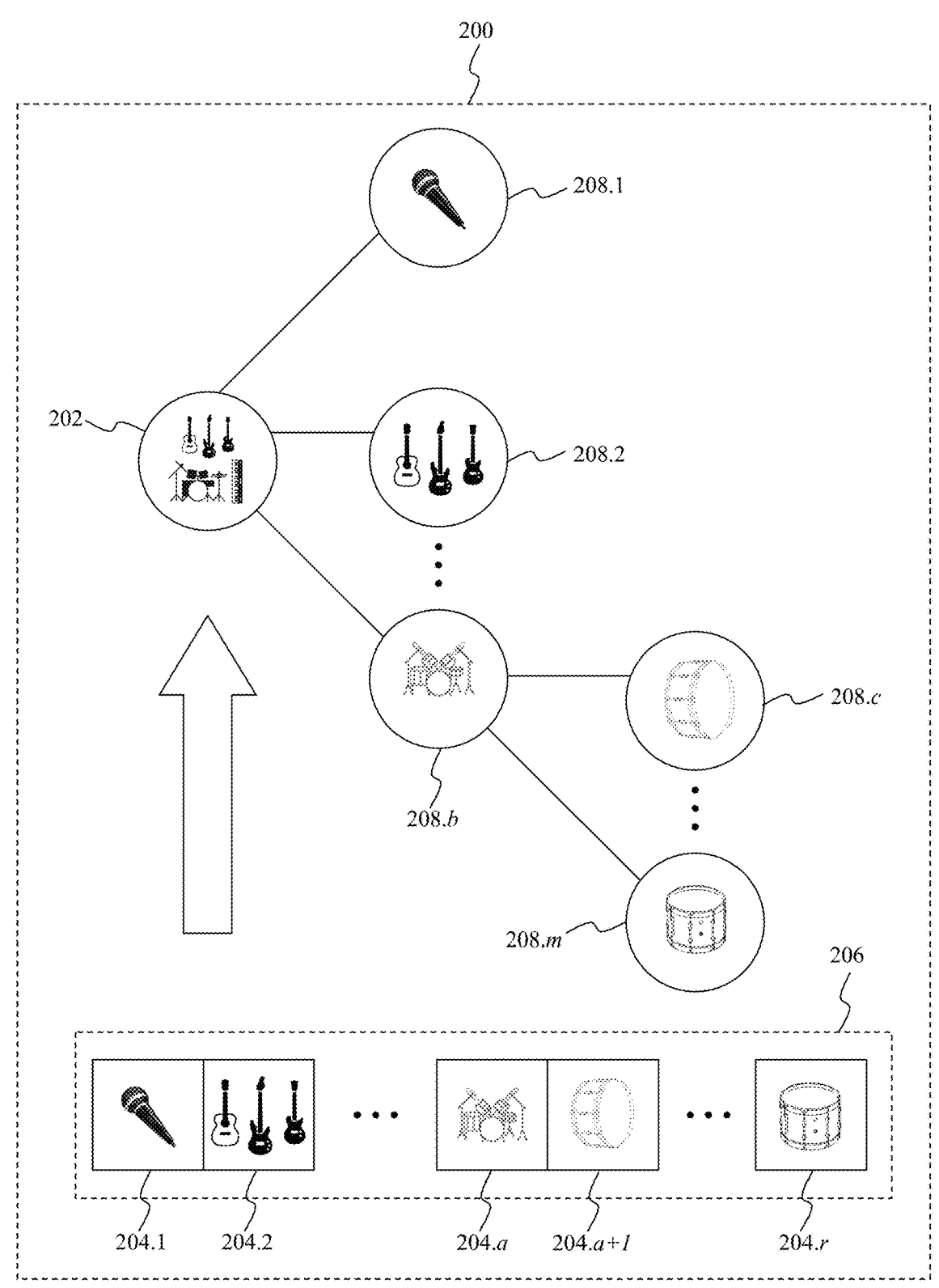
Figure 3:
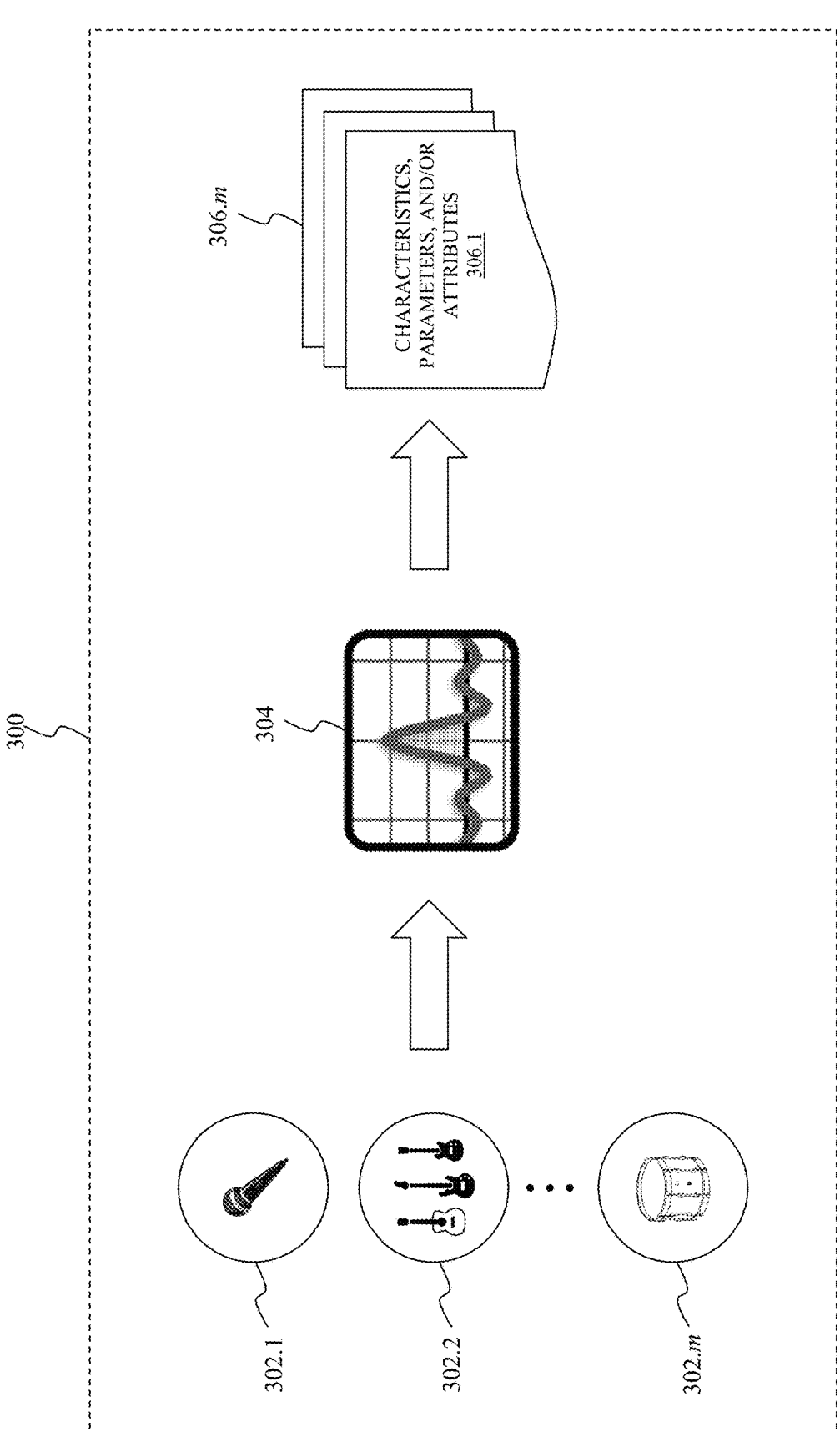
Figure 4:
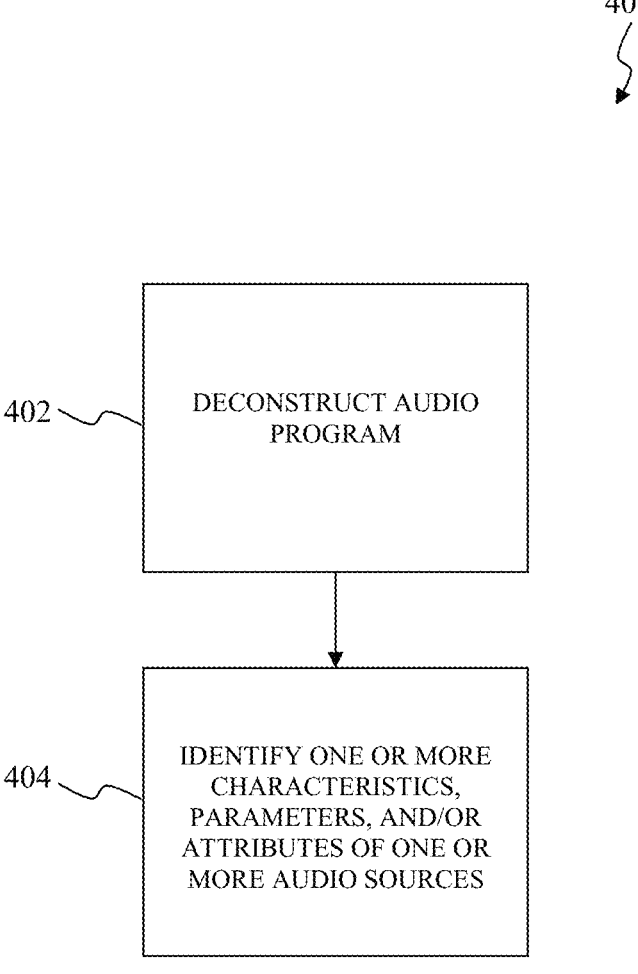
Figure 5:
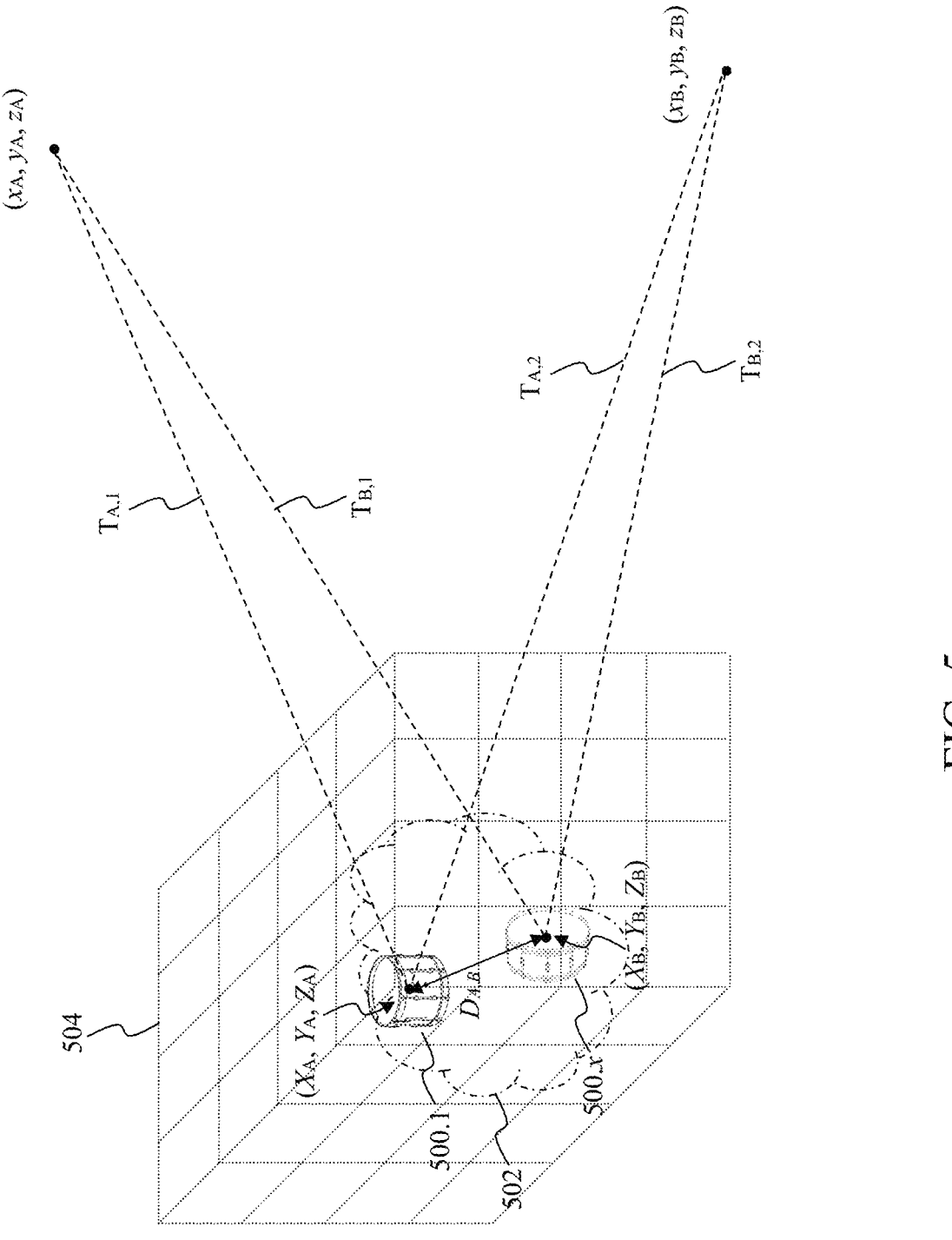
Figure 6:
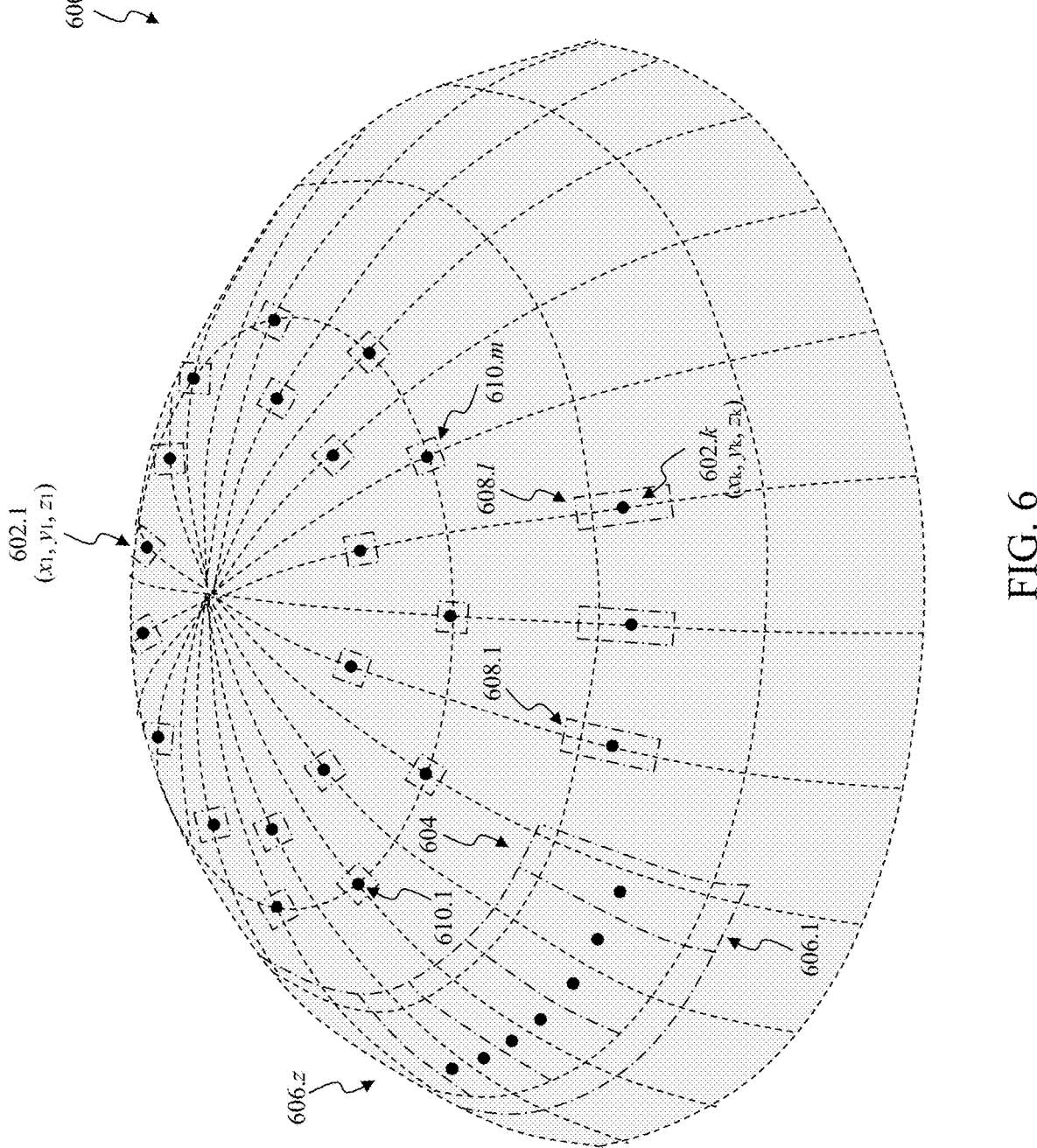
Figure 8A:
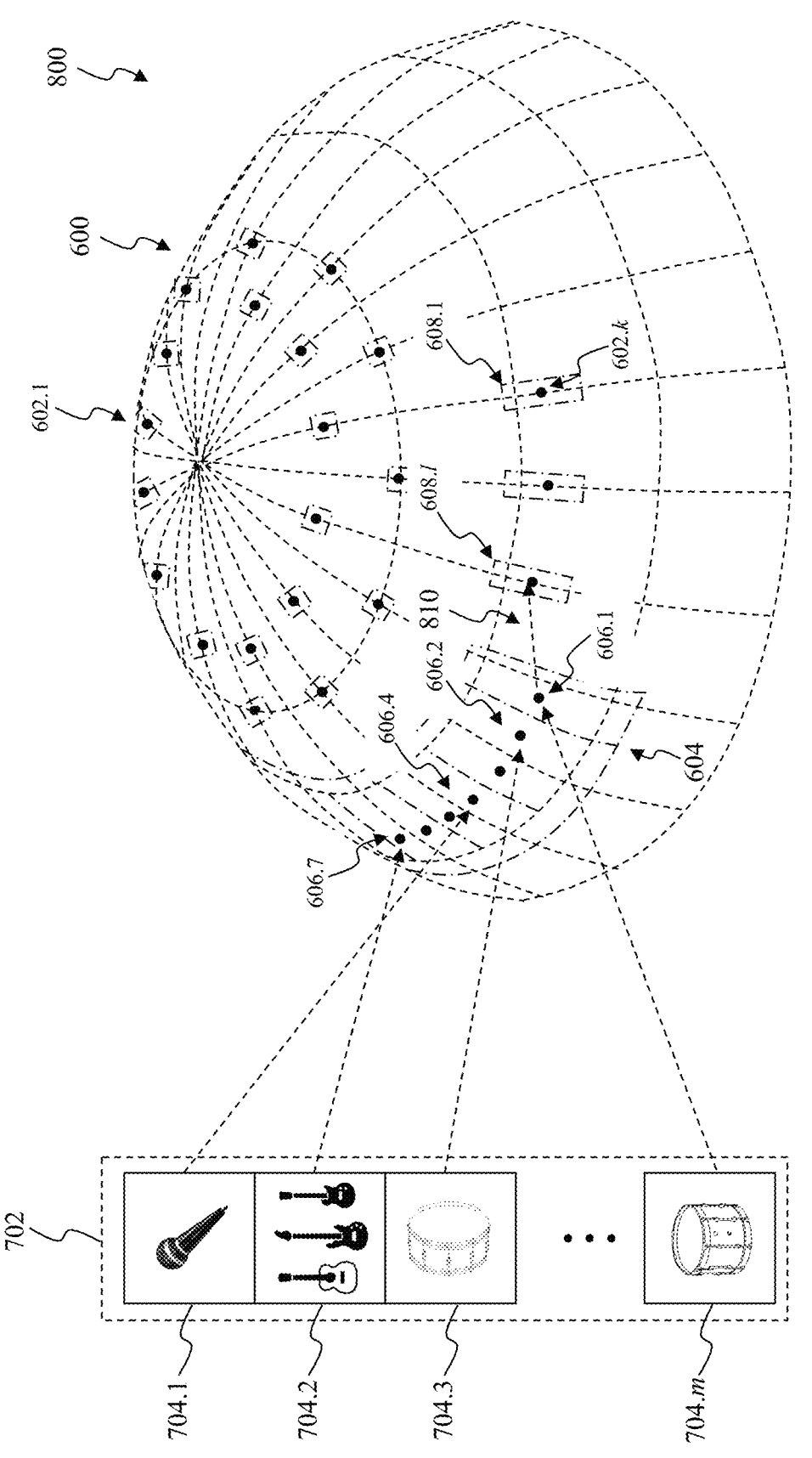
Figure 8B:
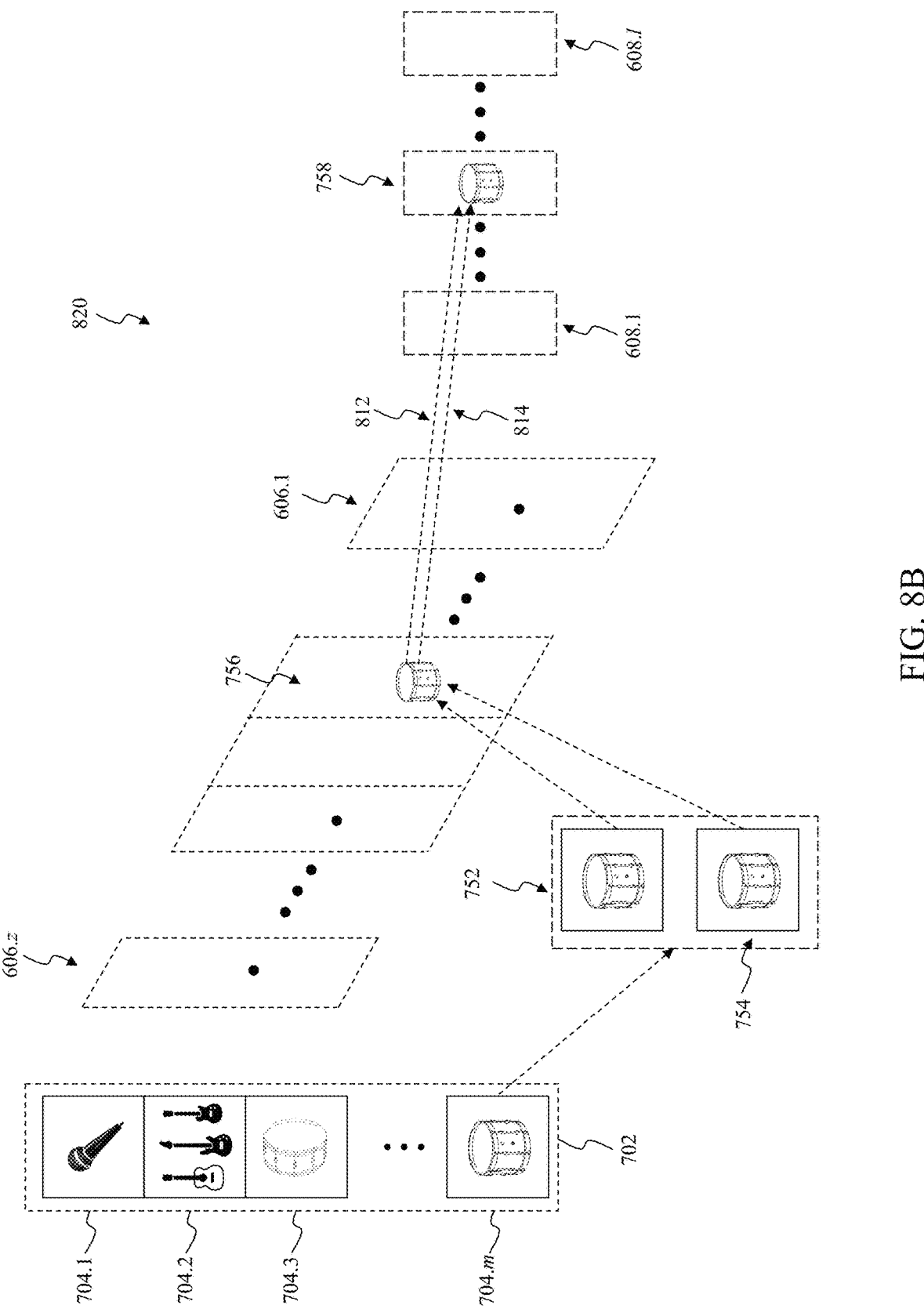
Figure 9:
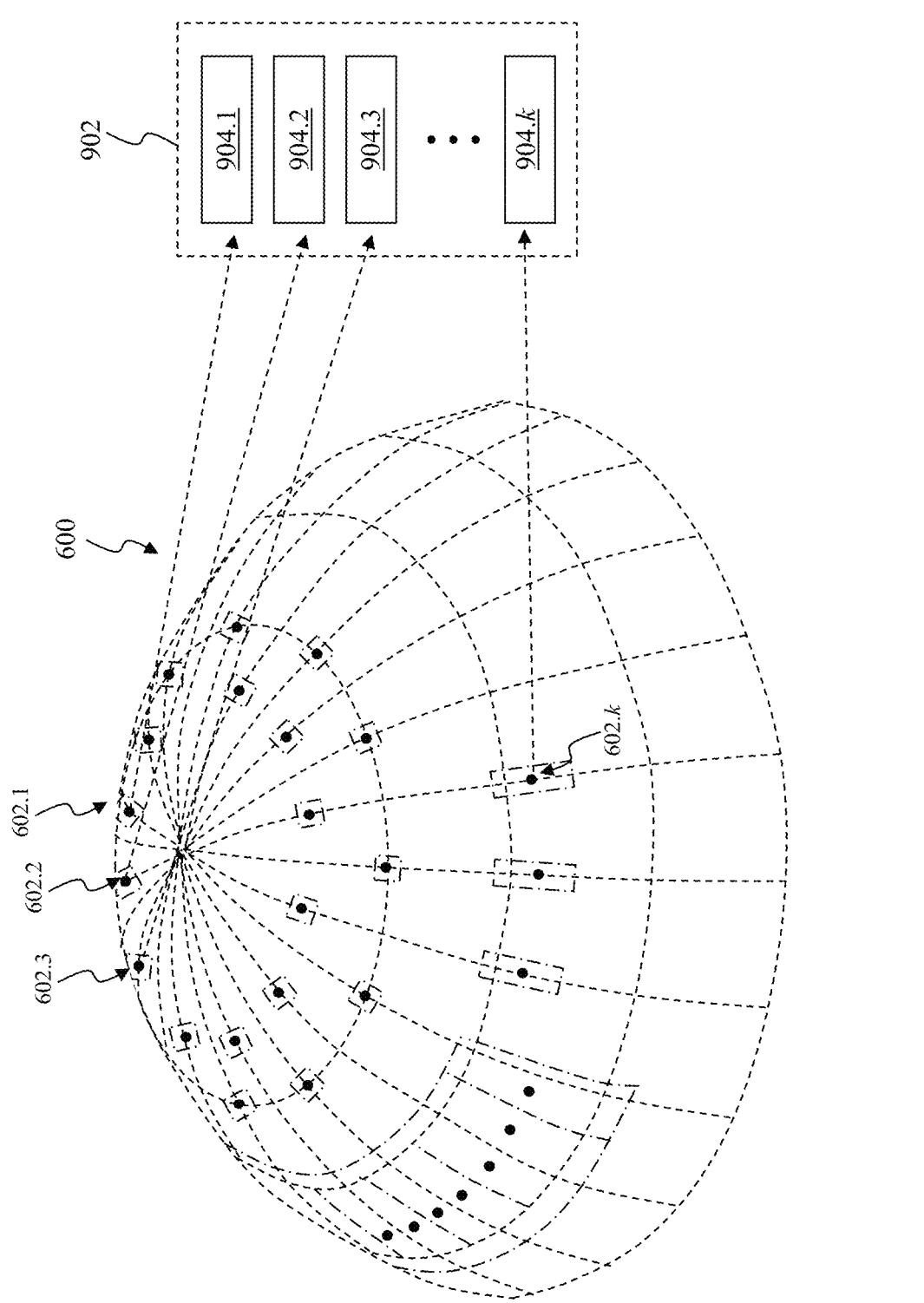
Figure 10:
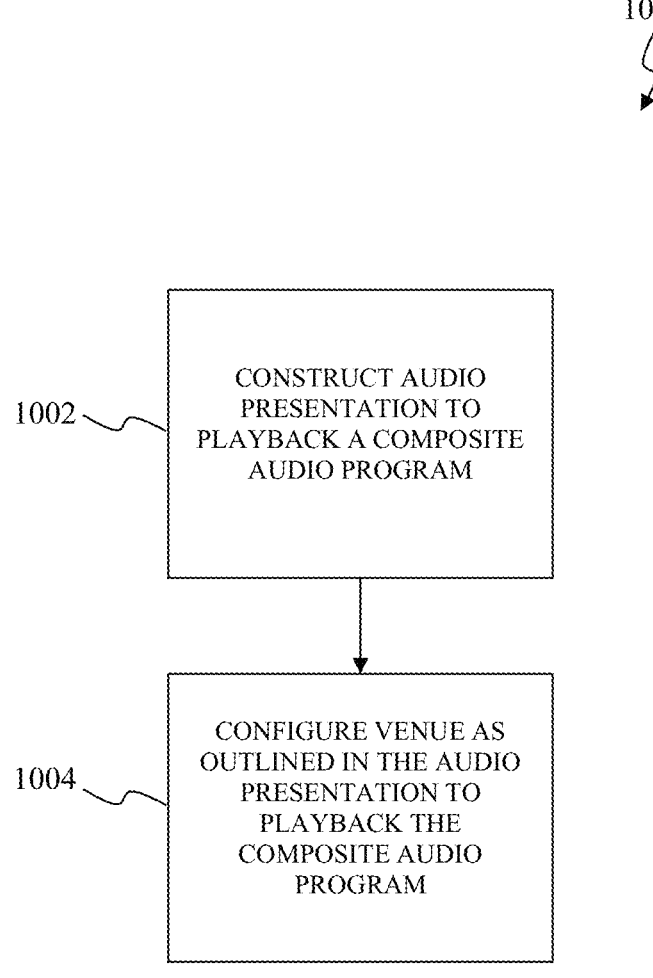
Figure 11:
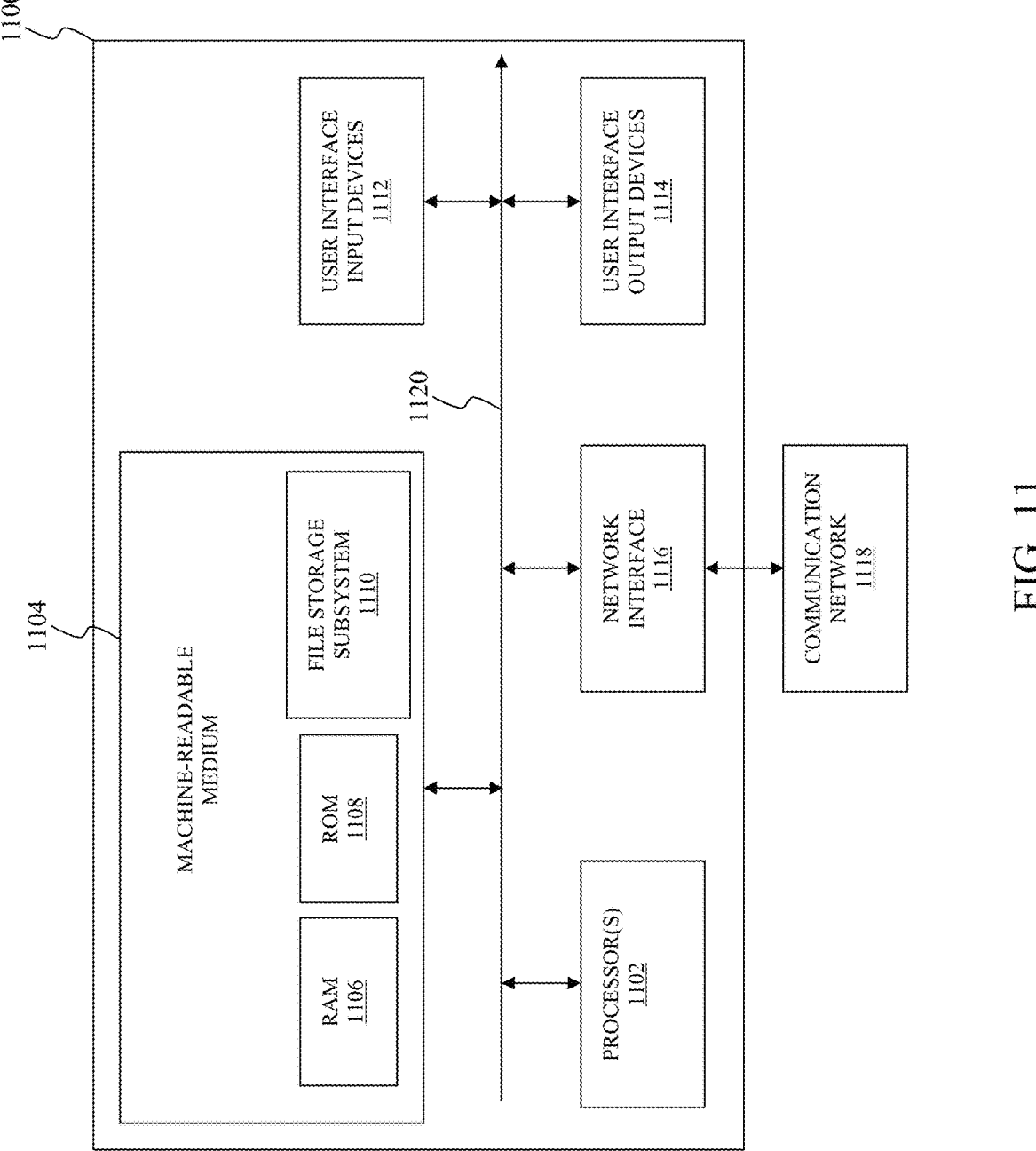

The accompanying drawings, which are incorporated herein and form a part of the specification, illustrate the present disclosure and, together with the description, further serve to explain the principals thereof and to enable a person skilled in the pertinent art to make and use the same. In the drawings:

FIG. 1 illustrates a high-level pictorial representation of an exemplary audio system that can be utilized by an exemplary real-world venue in accordance with some exemplary embodiments of the present disclosure;

FIG. 2 graphically illustrates operation of an exemplary audio de-mixing tool within the exemplary audio system for deconstructing a composite audio program in accordance with some exemplary embodiments of the present disclosure;

FIG. 3 graphically illustrates operation of the exemplary audio de-mixing tool for analyzing the composite audio program in accordance with some exemplary embodiments of the present disclosure;

FIG. 4 illustrates a flowchart of the exemplary audio de-mixing tool in accordance with some exemplary embodiments of the present disclosure;

FIG. 5 graphically illustrates an exemplary ensemble bounding volume that can be generated by an exemplary audio re-mixing tool within the exemplary audio system in accordance with some exemplary embodiments of the present disclosure;

FIG. 6 graphically illustrates an exemplary virtual venue that can be accessed by the exemplary audio re-mixing tool in accordance with some exemplary embodiments of the present disclosure;

FIG. 7A through FIG. 7F graphically illustrate operations of the exemplary audio re-mixing tool in constructing an exemplary static audio presentation to playback a composite audio program on real-world loudspeakers within the exemplary real-world venue in accordance with some exemplary embodiments of the present disclosure;

FIG. 8A through FIG. 8B graphically illustrate operations of the exemplary audio re-mixing tool in constructing an exemplary dynamic audio presentation to playback the composite audio program on real-world loudspeakers within the exemplary real-world venue in accordance with some exemplary embodiments of the present disclosure;

FIG. 9 graphically illustrates a high-level pictorial mapping of the exemplary virtual venue to the exemplary real-world venue in accordance with some exemplary embodiments of the present disclosure;

FIG. 10 illustrates a flowchart of the exemplary audio re-mixing tool in accordance with some exemplary embodiments of the present disclosure; and FIG. 11 graphically illustrates a simplified block diagram of a computing device that can be utilized to implement electronic devices within the exemplary real-world venue according to some embodiments of the present disclosure.

In the accompanying drawings, like reference numbers indicate identical or functionally similar elements. Additionally, the left most digit(s) of a reference number identifies the drawing in which the reference number first appears.

DETAILED DESCRIPTION

The following disclosure provides many different embodiments, or examples, for implementing different features of the provided subject matter. Specific examples of components and arrangements are described herein to simplify the present disclosure. These are, of course, merely examples and are not intended to be limiting. Aspects of the present disclosure are best understood from the following detailed description when read with the accompanying figures. The present disclosure may repeat reference numerals and/or letters in the various examples. This repetition does not in itself dictate a relationship between the various embodiments and/or configurations discussed. It is noted that, in accordance with the standard practice in the industry, features are not drawn to scale. In fact, the dimensions of the features may be arbitrarily increased or reduced for clarity of discussion.

The following disclosure may include spatially relative terms, such as "beneath," "below," "lower," "above," "on," "upper," and the like, herein for ease of description to describe relationship between elements or features as illustrated in the figure(s). These spatially relative terms are intended to encompass different orientations for the different embodiments, or examples, depicted in the figure(s). The different embodiments, or examples, may be otherwise oriented (rotated 90 degrees or at other orientations) and the spatially relative terms included herein may likewise be interpreted accordingly. Moreover, the following disclosure may include the terms "about," "approximately," or "substantially" to indicate the value of a given quantity can vary based on a particular technology. Based on the technology, the term "about" or "substantially" can indicate a value of a given quantity that varies within, for example, 1-15% of the value (e.g., ±1%, ±2%, ±5%, ±10%, or ±15% of the value).

Overview

Systems, methods, and apparatuses can playback a composite audio program that is associated with an event being hosted by a real-world venue. These systems, methods, and apparatuses can seamlessly deconstruct the composite audio program into multiple audio sounds that can be collectively played back by the real-world venue. As part of this deconstruction, these systems, methods, and apparatuses can analyze the audio sounds to identify one or more characteristics, parameters, and/or attributes of these audio sounds. These systems, methods, and apparatuses can intelligently construct an audio presentation from these multiple audio sounds to playback the composite audio program within the real-world venue. As part of this construction, these systems, methods, and apparatuses construct the audio presentation based upon the one or more characteristics, parameters, and/or attributes of these audio sounds. After the constructing the audio presentation, these systems, methods, and apparatuses can configure the real-world venue as outlined in the audio presentation to playback the composite audio program within the real-world venue. As part of this constructing, these systems, methods, and apparatuses can identify audio control signals that configure the real-world venue to playback the audio presentation through real-world loudspeakers within the real-world venue.

4

Exemplary Audio System for Use within an Exemplary Real-World Venue

FIG. 1 illustrates a high-level pictorial representation of an exemplary audio system that can be utilized by an exemplary real-world venue in accordance with some exemplary embodiments of the present disclosure. In the exemplary embodiment illustrated in FIG. 1, an audio playback system 100 can playback a composite audio program that is associated with an event being hosted by a real-world venue 102. For example, the real-world venue 102 can represent a music real-world venue, for example, a music theater, a music club, and/or a concert hall, a sporting real-world venue, for example, an arena, a convention center, and/or a stadium, and/or any other suitable real-world venue that will be apparent to those skilled in the relevant art(s) without departing the spirit and scope of the present disclosure. And as another example, the event can represent a musical event, a theatrical event, a sporting event, a motion picture, and/or any other suitable event that will be apparent to those skilled in the relevant art(s) without departing the spirit and scope of the present disclosure. In some embodiments, the audio playback system 100 can access the composite audio program. As described herein, the audio playback system 100 can execute an audio de-mixing tool to seamlessly deconstruct the composite audio program into multiple audio sounds that can be collectively played back by the real-world venue 102. And as described herein, the audio playback system 100 can execute an audio re-mixing tool to intelligently construct an audio presentation from these multiple audio sounds to playback the composite audio program within the real-world venue 102. In some embodiments, the audio playback system 100 can include an audio playback server 104 to perform the audio de-mixing and/or the audio re-mixing.

In the exemplary embodiment illustrated in FIG. 1, the audio playback server 104, an exemplary embodiment of which is to be described in further detail below, can execute an audio de-mixing tool 152 to seamlessly deconstruct a composite audio program 150 into multiple audio sounds that can be collectively played back by the real-world venue 102. Alternatively, or in addition to, the audio playback server 104 can execute an audio re-mixing tool 154 to intelligently construct the audio presentation from the multiple audio sounds to playback these audio sounds within the real-world venue 102 to playback the composite audio program 150 within the real-world venue 102. The audio de-mixing tool 152 and/or the audio re-mixing tool 154, which are to be described in further detail below, can represent one or more software tools that can be executed by one or more electrical, mechanical, and/or electro-mechanical devices that will be apparent to those skilled in the relevant art(s) without departing from the spirit and scope of the present disclosure. Those skilled in the relevant art(s) will recognize that embodiments of the disclosure described herein may be implemented in hardware, firmware, software, or any combination thereof without departing from the present disclosure. Further, those skilled in the relevant art(s) will recognize that firmware, software, routines, instructions, or the like may be described herein as performing certain actions. However, it should be appreciated that such descriptions are merely for convenience and that such actions in fact result from one or more electrical, mechanical, and/or electro-mechanical devices executing the firmware, software, routines, instructions, or the like. Alternatively, or in addition to, those skilled in the relevant art(s) will recognize that embodiments of the disclosure described herein may also be implemented as instructions stored on a machine-readable medium, which may be read and executed by one or more processors without departing from the present disclosure. A machine-readable medium may include any mechanism for storing in a form readable by a machine, such as a computing device to provide an example. For example, a machine-readable medium may include read only memory (ROM), random access memory (RAM), magnetic disk storage media, optical storage media, flash memory devices, and the like.

As illustrated in FIG. 1, the audio playback server 104 can execute the audio de-mixing tool 152 to seamlessly deconstruct the composite audio program 150 into audio sounds 156.1 through 156.n. In some embodiments, the audio sounds 156.1 through 156.n can include one or more audio channels, for example, a stereophonic (stereo) audio channel that can include two (2) audio channels, namely, a left monophonic (mono) audio channel and a right audio channel feed, or a 5.1 surround sound audio channel that can include five (5) audio channels, namely, a left mono audio channel, a center mono audio channel, a right mono audio channel, a left mono audio channel, and/or a right mono audio channel, among others. In some embodiments, the audio sounds 156.1 through 156.n can include sounds generated by audio sources such as electronic, mechanical, and/or electro-mechanical devices that will be apparent to those skilled in the relevant art(s) without departing from the spirit and scope of the present disclosure. For example, these electronic, mechanical, and/or electro-mechanical devices can include a simple musical instrument, such as a snare drum to provide an example, and/or more complicated collections of musical instruments, such as a standard drum kit having a snare drum, a bass drum, one or more tom-toms, one or more cymbals, and/or one or more hi-hat cymbals to provide an example. In some embodiments, the simple musical instrument can include a percussion instrument, a wind instrument, a string instrument, and/or an electronic instrument to provide some examples. And, in some embodiments, the collections of musical instruments can include musical instruments from the same classification of musical instruments, such as percussion instruments, wind instruments, string instruments, and/or electronic instruments to provide some examples and/or from different classifications of musical instruments. Alternatively, or in addition to, the audio sounds 156.1 through 156.n can include natural audio sounds generated by non-human organisms and/or human organisms, such as musical audio sounds produced with the human voice, often referred to as vocals. These natural audio sounds can also include natural, non-biological sources, such as water and/or thunder to provide some examples. In some embodiments, the audio de-mixing tool 152 can analyze the audio sounds 156.1 through 156.n to identify one or more audio sources, such as one or more of the electronic, mechanical, and/or electro-mechanical devices, one or more non-human organisms, and/or one or more human organisms, among others, that generated these audio sounds.

As described herein, the audio de-mixing tool 152 can deconstruct the composite audio program 150 into the audio sounds 156.1 through 156.n. In some embodiments, the audio de-mixing tool 152 can analyze the composite audio program 150 to identify the audio sounds 156.1 through 156.n that are present within the composite audio program 150. As part of this identifying, the audio de-mixing tool 152 can iteratively search the composite audio program 150 for the audio sounds 156.1 through 156.n. For example, the audio de-mixing tool 152 can search the composite audio program 150 for audio sounds generated by a snare drum, audio sounds generated by a bass guitar, etc. In some embodiments, the audio de-mixing tool 152 can iteratively search the composite audio program 150 starting with the most prevalent, or dominant, audio sound from among audio sounds 156.1 through 156.n. After identifying the audio sounds 156.1 through 156.n, the audio de-mixing tool 152 can deconstruct the composite audio program 150 into the audio sounds 156.1 through 156.n. As part of this deconstructing, the audio de-mixing tool 152 can iteratively isolate the audio sounds 156.1 through 156.n from the composite audio program 150 to provide corresponding audio sounds from the audio sounds 156.1 through 156.n. After this deconstructing, the audio de-mixing tool 152 can store the corresponding audio sounds for retrieval by the audio re-mixing tool 154 as described herein.

As illustrated in FIG. 1, the audio re-mixing tool 154 can intelligently construct the audio presentation from the audio sounds 156.1 through 156.n to playback the composite audio program 150 within the real-world venue 102. In some embodiments, the audio re-mixing tool 154 can construct the audio presentation before, for example, offline prior to the event, and/or during the event, for example, contemporaneously with the event in real-time, or near real-time. In some embodiments, the audio presentation, when played back by the audio playback server 104, can configure the real-world venue 102 to playback the audio sounds 156.1 through 156.n on the real-world loudspeakers within the real-world venue 102. In the exemplary embodiment illustrated in FIG. 1, the audio re-mixing tool 154 can assign the audio sounds 156.1 through 156.n to the real-world loudspeakers within the real-world venue 102 to construct the audio presentation to playback the composite audio program 150 within the real-world venue 102. In some embodiments, the audio presentation can represent a static audio presentation whereby the assignment of the audio sounds 156.1 through 156.n to the real-world loudspeakers within the real-world venue 102 remains fixed, or static, throughout the composite audio program 150 and/or a dynamic audio presentation whereby the assignment of the audio sounds 156.1 through 156.n to the real-world loudspeakers within the real-world venue 102 dynamically moves, changes, or switches during the composite audio program. In some embodiments, the audio re-mixing tool 154 can consider one or more characteristics, parameters, and/or attributes of the audio sounds 156.1 through 156.n when constructing the audio presentation. In some embodiments, these characteristics, parameters, and/or attributes can be utilized by the audio re-mixing tool 154 to provide a more realistic, aesthetically pleasing playback of the composite audio program 150 and, at the same time, lessening the effects of comb filtering and/or audio latency, as described herein, within the real-world venue 102. As such, lessening the effects of comb filtering and/or audio latency, as described herein, in the real-world venue 102 can be important for ensuring a seamless and immersive experience.

After assigning the audio sounds 156.1 through 156.n, the audio re-mixing tool 154 can identify audio control signals 158.1 through 158.i that configure audio equipment of the real-world venue 102 to playback the audio sounds 156.1 through 156.n through the real-world loudspeakers within the real-world venue 102. In some embodiments, the real-world venue 102 can include audio equipment, such as amplifiers, crossovers, equalizers, and/or mixers, to route and/or to signal condition the audio sounds 156.1 through 156.n for playback within the real-world venue 102. In these embodiments, the audio re-mixing tool 154 can generate the audio control signals 158.1 through 158.i to configure the audio equipment within the real-world venue 102 to playback the audio sounds 156.1 through 156.*n* on the real-world loudspeakers within the real-world venue 102. In these embodiments, the audio control signals 158.1 through 158.*i* can cause the audio equipment of the real-world venue 102 to route and/or to signal condition the audio sounds 156.1 through 156.*n* for playback through the real-world loudspeakers within the real-world venue 102 as outlined in the audio presentation.

In the exemplary embodiment illustrated in FIG. 1, the real-world venue 102 can represent a three-dimensional structure, for example, a hemisphere structure, also referred to as a hemispherical dome. In some embodiments, the real-world venue 102 can include one or more visual displays, often referred to as a three-dimensional media plane, that are spread across the interior of the real-world venue 102. In these embodiments, the one or more visual displays can include a series of rows and a series of columns of picture elements, also referred to as pixels, in three-dimensions that form a three-dimensional media plane to project an image or a series of images, often referred to as video, that can be associated with, for example, the event onto the three-dimensional media plane. In these embodiments, the pixels can be implemented using one or more light-emitting diode (LED) displays, one or more organic light-emitting diode (OLED) displays, and/or one or more quantum dots (QDs) displays to provide some examples. For example, the three-dimensional media plane can include a 19,000 by 13,500 LED visual display that wraps around the interior of the real-world venue 102 to form an approximate 160,000 square foot visual display.

And as illustrated in FIG. 1, the real-world venue 102 can playback the audio sounds 156.1 through 156.*n* within the real-world venue 102 as outlined in the audio presentation to playback the composite audio program 150 within the real-world venue 102. As illustrated in FIG. 1, the real-world venue 102 can include real-world loudspeakers 106.1 through 106.*i* to playback the audio sounds 156.1 through 156.*n* within the real-world venue 102. Alternatively, or in addition to, the real-world venue 102 can include the audio equipment, as described herein, to route the audio sounds 156.1 through 156.*n* to the real-world loudspeakers 106.1 through 106.*i* and/or to signal condition the audio sounds 156.1 through 156.*n*. In some embodiments, the audio re-mixing tool 154 can playback the audio sounds 156.1 through 156.*n* through the real-world loudspeakers 106.1 through 106.*i* as outlined in the audio presentation in a substantially similar manner as described herein. In some embodiments, the real-world loudspeakers 106.1 through 106.*i* can include a proscenium array real-world loudspeaker system that is situated at, or near, a proscenium of the real-world venue 102, one or more effects extensions array real-world loudspeaker systems that are situated at, or near, the proscenium array real-world loudspeaker system, and/or one or more environmental array real-world loudspeaker systems that are situated throughout the real-world venue 102. In some embodiments, the proscenium array real-world loudspeaker system, the one or more effects extensions array real-world loudspeaker systems, and/or the one or more environmental array real-world loudspeaker systems can include one or more one or more real-world loudspeakers that can include one or more super tweeters, one or more tweeters, one or more mid-range speakers, one or more woofers, one or more subwoofers, and/or one or more full-range speakers to provide some examples.

Exemplary Audio De-Mixing Tool for Deconstructing a Composite Audio Program

FIG. 2 graphically illustrates operation of an exemplary audio de-mixing tool within the exemplary audio system for deconstructing a composite audio program in accordance with some exemplary embodiments of the present disclosure. In the exemplary embodiment illustrated in FIG. 2, an audio de-mixing tool 200 can access a composite audio program, such as the composite audio program 150. As described herein, the audio de-mixing tool 200 can seamlessly deconstruct the composite audio program into multiple audio sounds that can be collectively played back by the real-world venue. In some embodiments, the audio de-mixing tool 200 can represent one or more software tools that can be executed by one or more electrical, mechanical, and/or electro-mechanical devices that will be apparent to those skilled in the relevant art(s) without departing from the spirit and scope of the present disclosure, such as the audio playback server 104, to seamlessly deconstruct the composite audio program into the multiple audio sounds. The audio de-mixing tool 200 as described herein can represent an exemplary embodiment of the audio de-mixing tool 152.

In the exemplary embodiment illustrated in FIG. 2, the audio de-mixing tool 200 can deconstruct the composite audio program 202 into audio sounds 208.1 through 208.*m* through a process referred to as musical source separation. In some embodiments, the audio sounds 208.1 through 208.*m* can include one or more audio channels, for example, a stereophonic (stereo) audio channel that can include two (2) audio channels, namely, a left monophonic (mono) audio channel and a right audio channel feed, or a 5.1 surround sound audio channel that can include five (5) audio channels, namely, a left mono audio channel, a center mono audio channel, a right mono audio channel, a left mono audio channel, and/or a right mono audio channel, among others. As part of this musical source separation, the audio de-mixing tool 200 can analyze the composite audio program 202 to identify audio sounds 208.1 through 208.*m* from the composite audio program 202 that correspond, for example, match sample audio sounds from among sample audio sounds 204.1 through 204.*r* within an electronic library of audio sounds 206. The sample audio sounds 204.1 through 204.*r* can include audio sounds generated by one or more audio sources, such as one or more electronic, mechanical, and/or electro-mechanical devices, one or more non-human organisms, and/or one or more human organisms, among others, as described herein. For example, the sample audio sounds 204.1 through 204.*r* can include an audio sample 204.1 that is generated by the microphone, an audio sample 204.2 that is generated by the acoustic guitar, the electric guitar, and the bass guitar, an audio sample 204.*a* that is generated by the drum kit, an audio sample 204.*a*+1 that is generated by the bass drum from among the drum kit, an audio sample 204.*r* that is generated by the snare drum from among the drum kit, among others.

In some embodiments, the audio de-mixing tool 200 can iteratively search the composite audio program 202 for the presence of the sample audio sounds 204.1 through 204.*r*. For example, the audio de-mixing tool 200 can iteratively search the composite audio program 202 for the presence of the audio sample 204.1 that is generated by the microphone, the audio sample 204.2 that is generated by the acoustic guitar, the electric guitar, and the bass guitar, the audio sample 204.*a* that is generated by the drum kit, the audio sample 204.*a*+1 that is generated by the bass drum from among the drum kit, the audio sample 204.*r* that is generated by the snare drum from among the drum kit, among others.

In the exemplary embodiment illustrated in FIG. 2, the audio de-mixing tool 200 can execute a pattern recognition algorithm to iteratively search the composite audio program 202 for the sample audio sounds 204.1 through 204.r. In some embodiments, the pattern recognition algorithm can include a template matching algorithm that matches the sample audio sounds 204.1 through 204.r to the composite audio program 202 and/or a structural/syntactic matching algorithm or a statistical matching algorithm that involves semi-supervised and supervised machine learning, respectively, of the sample audio sounds 204.1 through 204.r and their subsequent matching to the composite audio program 202.

As part of this musical source separation, the audio de-mixing tool 200 can deconstruct the composite audio program 202 into the audio sounds 208.1 through 208.m. After identifying the sample audio sounds 204.1 through 204.r, the audio de-mixing tool 200 can iteratively isolate each of the sample audio sounds 204.1 through 204.r that are present within the composite audio program 202 from the composite audio program 202 to provide the audio sounds 208.1 through 208.m. In some embodiments, the audio de-mixing tool 200 can iteratively subtract each of the sample audio sounds 204.1 through 204.r that are present within the composite audio program 202 from the composite audio program 202 to isolate each of the sample audio sounds 204.1 through 204.r that are present within the composite audio program 202. From the example above, the audio de-mixing tool 200 can identify that the audio sample 204.1 that is generated by the microphone, the audio sample 204.2 that is generated by the acoustic guitar, the electric guitar, and the bass guitar, the audio sample 204.a that is generated by the drum kit are present within the composite audio program 202, among others. In this example, the audio de-mixing tool 200 can isolate the audio sounds that are generated by the microphone from the composite audio program 202 to provide a first audio sound from among the audio sounds 208.1 through 208.b, the audio sounds that are generated by the acoustic guitar, the electric guitar, and the bass guitar to provide a second audio sound from among the audio sounds 208.1 through 208.b, and/or the audio sounds that are generated by the drum kit from the composite audio program 202 to provide an $b^{th}$ audio sound from among the audio sounds 208.1 through 208.b, among others.

In some embodiments, the audio de-mixing tool 200 can hierarchically deconstruct the composite audio program 202 into the audio sounds 208.1 through 208.m. In these embodiments, the audio de-mixing tool 200 can analyze the composite audio program 202 to identify sample audio sounds corresponding to collections of musical instruments from among sample audio sounds 204.1 through 204.r, such as the audio sample 204.a that is generated by the drum kit to provide an example, that are present within the composite audio program 202. After identifying these sample audio sounds, the audio de-mixing tool 200 can iteratively isolate each of these sample audio sounds that are present within the composite audio program 202 to provide audio sounds corresponding to collections of musical instruments from among the audio sounds 208.1 through 208.m, such as the audio sound 208.b to provide an example. Thereafter, the audio de-mixing tool 200 can once again deconstruct the audio sound 208.b into the audio sounds 208.c through 208.m to provide the audio sounds 208.1 through 208.m. The audio de-mixing tool 200 can analyze the audio sound 208.b to identify sample audio sounds from among the sample audio sounds 204.1 through 204.r that are present within the audio sound 208.b. After identifying the sample audio sounds 204.1 through 204.r that are present within the audio sound 208.b, the audio de-mixing tool 200 can iteratively isolate each of the sample audio sounds 204.1 through 204.r that are present within the audio sound 208.b from the audio sound 208.b to provide audio sounds 208.c through 208.m from among the audio sounds 208.1 through 208.m.

In some embodiments, the audio de-mixing tool 200 can analyze the audio sounds 208.1 through 208.m to identify one or more audio sources, such as the one or more electronic, mechanical, and/or electro-mechanical devices, the one or more non-human organisms, and/or the one or more human organisms, among others, as described herein, that generated these audio sounds. In these embodiments, the audio de-mixing tool 200 can analyze one or more of the audio sounds 208.1 through 208.m to identify whether a simple musical instrument, such as a snare drum to provide an example, generated these audio sounds. Alternatively, or in addition to, the can analyze one or more of the audio sounds 208.1 through 208.m to identify whether more complicated collections of musical instruments, such as a standard drum kit having a snare drum, a bass drum, one or more tom-toms, one or more cymbals, and/or one or more hi-hat cymbals to provide an example, generated these audio sounds. From the example above, the audio de-mixing tool 200 can analyze the first audio sound from among the audio sounds 208.1 through 208.m to identify that the microphone is generated this audio sound, can analyze the second audio sound from among the audio sounds 208.1 through 208.m to identify that the acoustic guitar, the electric guitar, and the bass guitar generated this audio sound, and can analyze the $b^{th}$ audio sound from among the audio sounds 208.1 through 208.m to identify that the drum kit generated this audio sound.

Exemplary Audio De-Mixing Tool for Analyzing Audio Sounds of the Composite Audio Program FIG. 3 graphically illustrates operation of the exemplary audio de-mixing tool for analyzing the composite audio program in accordance with some exemplary embodiments of the present disclosure. In the exemplary embodiment illustrated in FIG. 3, an audio de-mixing tool 300 can access multiple audio sounds of a composite audio program, such as the composite audio program 150. As described herein, the audio de-mixing tool 300 can analyze the multiple audio sounds to identify one or more characteristics, parameters, and/or attributes of these audio sounds. As described herein, the one or more characteristics, parameters, and/or attributes can be used by an audio re-mixing tool, such as the audio re-mixing tool 154, to construct an audio presentation to playback the composite audio program within the real-world venue. In some embodiments, the audio re-mixing tool can utilize the one or more characteristics, parameters, and/or attributes to provide a more realistic, aesthetically pleasing playback of the composite audio program and, at the same time, lessening the effects of comb filtering and/or audio latency, as described herein, within the real-world venue. In these embodiments, lessening the effects of comb filtering and/or audio latency, as described herein, in the real-world venue can be important for ensuring a seamless and immersive experience As illustrated in FIG. 3, the audio de-mixing tool 300 can access audio sounds 302.1 through 302.m that have been deconstructed from the composite audio program in a substantially similar manner as described herein. In some embodiments, the audio sounds 302.1 through 302.m can represent sounds generated by the one or more of the electronic, mechanical, and/or electro-mechanical devices, one or more non-human organisms, and/or one or more human organisms, among others as described herein. After accessing the audio sounds 302.1 through 302.m, the audio de-mixing tool 300 can analyze the audio sounds 302.1 through 302.m to identify one or more characteristics, parameters, and/or attributes 306.1 through 306.m corresponding to these audio sounds. As illustrated in FIG. 3, the audio de-mixing tool 300 can include an audio sound analysis software engine 304 to process the audio sounds 302.1 through 302.m to identify the one or more characteristics, parameters, and/or attributes 306.1 through 306.m. For example, the audio sound analysis software engine 304 can process the audio sound 302.1 to identify the one or more characteristics, parameters, and/or attributes 306.1 corresponding to the audio sound 302.1, the audio sound 302.2 to identify the one or more characteristics, parameters, and/or attributes 306.2 corresponding to the audio sound 302.2, among others. In some embodiments, the one or more characteristics, parameters, and/or attributes 306.1 through 306.m can include determine pitches, loudness, timbres, frequencies, amplitudes, wavelengths, and/or velocities, among others, of the audio sounds 302.1 through 302.m. In these embodiments, the audio sound analysis software engine 304 can compare the pitches, the loudness, the timbres, the frequencies, the amplitudes, the wavelengths, and/or the velocities between the audio sounds 302.1 through 302.m to identify the one or more characteristics, parameters, and/or attributes 306.1 through 306.m. In some embodiments, the audio sound analysis software engine 304 can store the one or more characteristics, parameters, and/or attributes 306.1 through 306.m as an organized collection of data, often referred to as a database. The database may include one or more data tables having data values, such as alphanumeric strings, integers, decimals, floating points, dates, times, binary values, Boolean values, and/or enumerations to provide some examples. The database can be a columnar database, a relational database, a key-store database, a graph database, and/or a document store to provide some examples. In these embodiments, the audio re-mixing tool can access the database to retrieve the one or more characteristics, parameters, and/or attributes 306.1 through 306.m to construct an audio presentation to playback the composite audio program within the real-world venue as described herein.

In some embodiments, the one or more characteristics, parameters, and/or attributes 306.1 through 306.m can indicate spatial positioning between the one or more audio sources that generated the audio sounds 302.1 through 302.m, audio transients of the audio sounds 302.1 through 302.m, spatial movement of the one or more audio sources that generated the audio sounds 302.1 through 302.m, timing relationships between the audio sounds 302.1 through 302.m, audio effects within the audio sounds 302.1 through 302.m, and/or any other suitable characteristic, parameter, and/or attribute of, or between, the audio sounds 302.1 through 302.m that will be recognized by those skilled in the relevant art(s) without departing from the spirit and scope of the present disclosure.

The spatial positioning between the one or more audio sources that generated the audio sounds 302.1 through 302.m indicates relative positioning between two or more audio sources that generated two or more of the audio sounds 302.1 through 302.m with respect to one another. In these embodiments, the audio sound analysis software engine 304 can perform a three-dimensional audio sound localization technique between the two or more of the audio sounds 302.1 through 302.m to estimate the spatial positioning between the two or more audio sources that generated these audio sounds. In these embodiments, the audio sound analysis software engine 304 can estimate interaural time differences (ITDs) between the two or more of the audio sounds 302.1 through 302.m and/or interaural intensity differences (IIDs) between the two or more of the audio sounds 302.1 through 302.m to estimate the relative positioning between the two or more audio sources with respect to one another.

The audio transients of the audio sounds 302.1 through 302.m indicate envelopes of the audio sounds 302.1 through 302.m over time. In some embodiments, these envelopes can indicate attack transients, decay transients, sustain transients, and/or release transients of the audio sounds 302.1 through 302.m. In these embodiments, the attack transients represent first durations in time for the audio sounds 302.1 through 302.m to reach their maximum amplitudes and the decay transients represent second durations in time for the audio sounds 302.1 through 302.m to decrease from their maximum amplitudes to their steady state amplitudes. In these embodiments, the sustain transients represent third durations in time that the audio sounds 302.1 through 302.m are at their steady state amplitudes and the release transients represent fourth durations in time for the audio sounds 302.1 through 302.m to decrease from their steady state amplitudes to their minimum amplitudes.

The spatial movements of the one or more audio sources that generated the audio sounds 302.1 through 302.m indicate relative movement between two or more audio sources that generated two or more of the audio sounds 302.1 through 302.m with respect to one another. In the exemplary embodiment illustrated in FIG. 3, the two or more audio sources can change location, or move around, during the composite audio program. In some embodiments, the audio sound analysis software engine 304 can analyze the audio sounds 302.1 through 302.m to identify whether the two or more audio sources are moving. For example, the audio de-mixing tool 300 can compare amplitudes and/or phases of two or more of the audio sounds 302.1 through 302.m corresponding to the two or more audio sources with one another to estimate whether the two or more audio sources are moving with respect to one another.

The timing relationships between the audio sounds 302.1 through 302.m indicate relative timing relationships between two or more audio sources that generated two or more of the audio sounds 302.1 through 302.m with respect to one another. In some embodiments, the timing relationships can be referred to as beat relationships, bar relationships, and/or tick relationships between the two or more audio sources. These relative timing relationships can include time signatures, such as simple time meters, compound meters, beating time meters, common time meters, complex time meters, mixed meters, additive meters, irrational meters, and/or the like. In some embodiments, the audio sound analysis software engine 304 can execute a timing relationship algorithm to compare the two or more of the audio sounds 302.1 through 302.m with each other to identify the relative timing relationships between the two or more audio sources. As part of the timing relationship algorithm, the audio sound analysis software engine 304 can classify the two or more audio sources. In some embodiments, the audio sound analysis software engine 304 can classify each of the two or more audio sources according to a general type, for example, a percussion instrument, a wind instrument, a string instrument, and/or an electronic instrument. Thereafter, the audio sound analysis software engine 304 can identify the relative timing relationships between the two or more audio sources according to their general types. For example, a percussion instrument from among the two or more audio sources can have the same timing relationship as another percussion instrument from among the two or more audio sources while the percussion instrument can have a different timing relationship from a wind instrument from among the two or more audio sources. Alternatively, or in addition to, the audio sound analysis software engine 304 can classify each of two or more audio sources according to a specific type, for example, a snare drum, a bass drum, a tom-tom, a cymbal. Thereafter, the audio sound analysis software engine 304 can identify the relative timing relationships between the two or more audio sources according to their specific types. For example, a snare drum from among the two or more audio sources can have the same timing relationship as another snare drum from among the two or more audio sources while the snare drum can have a different timing relationship from a cello from among the two or more audio sources.

The audio effects within the audio sounds 302.1 through 302.*m* represent specific audio effects that can be applied by the one or more audio sources that generated the audio sounds 302.1 through 302.*m* to alter the audio sounds 302.1 through 302.*m*. In the exemplary embodiment illustrated in FIG. 3, the audio sound analysis software engine 304 can analyze the audio sounds 302.1 through 302.*m* to identify the audio effects within the audio sounds 302.1 through 302.*m*. In some embodiments, the one or more audio effects can include one or more echoes, flangers, phasers, choruses, equalizations, filterings, overdrives, pitch shifts, time stretches, resonators, voice effects, synthesizers, modulations, compressions, and/or the like to provide some examples. In some embodiments, the audio sound analysis software engine 304 can isolate the audio sounds being generated by the audio sources, referred to as parent audio sounds, from the audio effects within the audio sounds 302.1 through 302.*m*, referred to as child audio sounds.

Exemplary Operations of the Exemplary Audio De-Mixing Tool

FIG. 4 illustrates a flowchart of the exemplary audio de-mixing tool in accordance with some exemplary embodiments of the present disclosure. The disclosure is not limited to this operational description. Rather, it will be apparent to ordinary persons skilled in the relevant art(s) that other operational control flows are within the scope and spirit of the present disclosure. The following discussion describes an operational control flow 400 to seamlessly deconstruct a composite audio program, such as the composite audio program 150, and/or to identify characteristics, parameters, and/or attributes corresponding to audio sounds of the composite audio program. The operational control flow 400 can be performed by, for example, the audio de-mixing tool 152. In some embodiments, the operational control flow 400 can be executed by one or more computing devices, such as the audio playback server 104.

At operation 402, the operational control flow 400 deconstructs the composite audio program in a substantially similar manner as described herein to provide audio sounds, such as the audio sounds 156.1 through 156.*n*, the audio sounds 208.1 through 208.*m*, and/or the audio sounds 302.1 through 302.*m*.

At operation 404, the operational control flow 400 can analyze one or more of the audio sounds from operation 402 to identify one or more characteristics, parameters, and/or attributes of these audio sounds in a substantially similar manner as described herein. And as described herein, these characteristics, parameters, and/or attributes can be utilized by an audio re-mixing tool, such as the audio re-mixing tool 154, to construct an audio presentation to playback the composite audio program within the real-world venue.

Exemplary Operations of the Exemplary Audio Re-Mixing Tool

Before describing an exemplary audio re-mixing tool that can be implemented within the exemplary real-world venues described herein, an audio sound ensemble is to be generally described. As described herein, a composite audio program can include multiple audio sounds that are generated by multiple audio sources, such as percussion instruments, wind instruments, string instruments, and/or electronic instruments to provide some examples. As described herein, these audio sources can be logically grouped together to form audio sound ensembles. In some embodiments, those audio sources from among the multiple audio sources having similar characteristics, parameters, and/or attributes can be logically grouped together to form audio sound ensembles. In these embodiments, those audio sources from among the multiple audio sources having similar pitches, loudness, timbres, frequencies, amplitudes, wavelengths, and/or velocities to provide some examples can be logically grouped together to form audio sound ensembles. For example, a snare drum, a bass drum, one or more tom-toms, one or more cymbals, and/or one or more hi-hat cymbals having similar pitches, loudness, timbres, frequencies, amplitudes, wavelengths, and/or velocities can be logically grouped together to form an audio sound ensemble that is associated with a drum kit.

FIG. 5 graphically illustrates an exemplary ensemble bounding volume that can be generated by an exemplary audio re-mixing tool within the exemplary audio system in accordance with some exemplary embodiments of the present disclosure. In the exemplary embodiment illustrated in FIG. 5, multiple audio sources having similar characteristics, parameters, and/or attributes can be logically grouped together to form audio sound ensembles. As described herein, these audio sound ensembles can be associated with ensemble bounding volumes. These ensemble bounding volumes can outline spatial distances between audio sources within the audio sound ensembles to provide a more realistic, aesthetically pleasing playback of a composite audio program, such as the composite audio program 150, and, at the same time, lessening the effects of comb filtering and/or audio latency, as described herein, within a real-world venue, such as the real-world venue 102. As such, lessening the effects of comb filtering and/or audio latency, as described herein, in the real-world venue can be important for ensuring a seamless and immersive experience The discussion of FIG. 5 to follow is to describe an exemplary ensemble bounding volume for a drum kit that can include a snare drum, a bass drum, one or more tom-toms, one or more cymbals, and/or one or more hi-hat cymbals to provide some examples. Those skilled in the relevant art(s) will recognize that other ensemble bounding volumes for the drum kit and/or other ensemble bounding volumes for other audio sources can be implemented in a substantially similar manner as described herein without departing from the spirit and scope of the present disclosure.

As illustrated in FIG. 5, audio sources 500.1 through 500.*x*, such as a snare drum, a bass drum, one or more tom-toms, one or more cymbals, and/or one or more hi-hat cymbals of a drum kit to provide an example, having similar characteristics, parameters, and/or attributes from among multiple audio sources of the composite audio program can be logically grouped together to form an audio sound ensemble 502. In the exemplary embodiment illustrated in FIG. 5, the audio sound ensemble 502 having the audio sources 500.1 through 500.x can be associated with an ensemble bounding volume 504. Although the ensemble bounding volume 504 is illustrated as being a bounding box in three-dimensional space in FIG. 5, this is for illustrative purposes and are not intended to be limiting. Those skilled in the relevant art(s) will recognize that the ensemble bounding volume 504 can be any suitable three-dimensional volume, such as a bounding capsule, a bounding cylinder, a bounding ellipsoid, a bounding sphere, a bounding slab, and/or a bounding triangle, in three-dimensional space without departing from the spirit and scope of the present disclosure. And even though the ensemble bounding volume 504 is illustrated as being in the three-dimensional space in FIG. 5, those skilled in the relevant art(s) will recognize that the ensemble bounding volume 504 can be similarly implemented as any suitable two-dimensional shape, for example, a circle, a triangle, a quadrilateral, and/or a polygon, in two-dimensional space to form an ensemble bounding area without departing from the spirit and scope of the present disclosure. In some embodiments, the audio sources 500.1 through 500.x can be characterized as being diffuse audio sources, transient audio sources, and/or any combination of diffuse and transient audio sources. In these embodiments, the diffuse audio sources represent audio sources that produce sound that occurs gradually for a relatively long duration whereas a transient audio source produces a sound that occurs suddenly for a relatively short duration.

Generally, the ensemble bounding volume 504 outlines spatial distances between the audio sources 500.1 through 500.x in the three-dimensional space. In the exemplary embodiment illustrated in FIG. 5, the ensemble bounding volume 504 outlines maximum spatial distances between the audio sources 500.1 through 500.x in the three-dimensional space. In the exemplary embodiment illustrated in FIG. 5, the maximum spatial distances between the audio sources 500.1 through 500.x represent spatial distances between the audio sources 500.1 through 500.x having differences between audible flight times that are less than or equal to an audible flight time threshold. In some embodiments, the audible flight time threshold can be selective chosen such that the difference between the first audible flight time $T_{A,1}$ and the second audible flight time $T_{B,1}$ is less than a temporal resolution of human hearing, for example, between approximately twenty (20) ms and approximately thirty-six (36) ms. In these embodiments, the effects of comb filtering and/or audio latency are typically not noticed when the difference between the first audible flight time $T_{A,1}$ and the second audible flight time $T_{B,1}$ is less than the temporal resolution of human hearing as described herein.

As illustrated in FIG. 5, the audio de-mixing tool can identify a distance $D_{A,B}$ between a first three-dimensional coordinate $(X_A, Y_A, Z_A)$ within the ensemble bounding volume 504 that is associated with the audio source 500.1 and a second three-dimensional coordinate $(X_B, Y_B, Z_B)$ within the ensemble bounding volume 504 that is associated with the audio source 500.x. Thereafter, the audio de-mixing tool can estimate a first audible flight time $T_{A,1}$ for a first audio sound generated by the audio source 500.1 to propagate from the first three-dimensional coordinate $(X_A, Y_A, Z_A)$ to a first three-dimensional coordinate $(x_A, y_A, Z_A)$ within the three-dimensional space and a second audible flight time $T_{B,1}$ for a second audio sound generated by the audio source 500.x to propagate from the second three-dimensional coordinate $(X_B, Y_B, Z_B)$ to the first three-dimensional coordinate $(x_A, y_A, z_A)$ within the three-dimensional space. In some embodiments, the audio de-mixing tool can estimate the first audible flight time $T_{A,1}$ as approximately:

$$T1 = \frac{D1}{v_{sound}} \text{seconds}, \qquad (1)$$

and can estimate the second audible flight time $T_{B,1}$ as approximately:

$$T2 = \frac{D2}{v_{sound}} \text{seconds}, \qquad (2)$$

where T1 and T2 represent the first audible flight time $T_{A,1}$ and the second audible flight time $T_{B,1}$, respectively, D1 and D2 represent the distance D1 and the distance D2 between the first three-dimensional coordinate $(X_A, Y_A, Z_A)$ and the first three-dimensional coordinate $(x_A, y_A, Z_A)$ and between the second three-dimensional coordinate $(X_B, Y_B, Z_B)$ and the first three-dimensional coordinate $(x_A, y_A, Z_A)$, respectively, and $v_{sound}$ represents the speed of sound. Typically, the speed of sound in air is approximate three hundred forty-three (343) meters per second at twenty (20) degrees Celsius which can vary depending on temperature. Thereafter, the audio de-mixing tool can estimate a difference between the first audible flight time $T_{A,1}$ and the second audible flight time $T_B$. In some embodiments, the audio de-mixing tool can compare the difference between the first audible flight time $T_{A,1}$ and the second audible flight time $T_{B,1}$ with the audible flight time threshold. In these embodiments, the audio de-mixing tool can be permitted to spatially distance the audio source 500.1 and the audio source 500.x apart from each other in the three-dimensional space by the distance $D_{A,B}$ when the difference between the first audible flight time $T_{A,1}$ and the second audible flight time $T_{B,1}$ is less than or equal to the audible flight time threshold. In these embodiments, the distance $D_{A,B}$ can be characterized as being included within the ensemble bounding volume 504 when the difference between the first audible flight time $T_{A1}$ and the second audible flight time $T_{B,1}$ is less than or equal to the audible flight time threshold. Otherwise, in some embodiments, the audio de-mixing tool can be prevented from spatially distancing the audio source 500.1 and the audio source 500.x apart from each other in the three-dimensional space by the distance $D_{A,B}$ when the difference between the first audible flight time $T_{A,1}$ and the second audible flight time $T_{B,1}$ is greater than to the audible flight time threshold. In these embodiments, the distance $D_{A,B}$ can be characterized as being outside of the ensemble bounding volume 504 when the difference between the first audible flight time $T_{A,1}$ and the second audible flight time $T_{B,1}$ is less than or equal to the audible flight time threshold. In some embodiments, the audio de-mixing tool can empirically simulate the audio source 500.1 and the audio source 500.x at different three-dimensional coordinates to determine faces, vertices, and/or surfaces of the ensemble bounding volume 504 in the three-dimensional space. In these embodiments, the audio de-mixing tool can execute a computational algorithm, for example, a Monte Carlo algorithm, to empirically simulate the audio source 500.1 and the audio source 500.x at the different three-dimensional coordinates.

Moreover, the audio de-mixing tool can estimate a first audible flight time $T_{A,2}$ for the first audio sound generated by the audio source 500.1 to propagate from the first three-dimensional coordinate $(X_A, Y_A, Z_A)$ to a second three-dimensional coordinate $(x_B y_B, Z_B)$ within the three-dimensional space and a second audible flight time $T_{B,2}$ for the second audio sound generated by the audio source $500.x$ to propagate from the second three-dimensional coordinate $(X_B, Y_B, Z_B)$ to the second three-dimensional coordinate $(x_B y_B, Z_B)$ within the three-dimensional space in a substantially similar manner as described herein. In some embodiments, a difference between the first audible flight time $T_{A,2}$ and the second audible flight time $T_{B,2}$ is approximately equal to the difference between the first audible flight time $T_{A,1}$ and the second audible flight time $T_{B,1}$. In these embodiments, the first audio sound generated by the audio source $500.1$ and the second audio sound generated by the audio source $500.x$ at the first three-dimensional coordinate $(x_A, y_A, Z_A)$ can be characterized as sounding substantially similar to the first audio sound generated by the audio source $500.1$ and the second audio sound generated by the audio source $500.x$ at the second three-dimensional coordinate $(x_B y_B, Z_B)$. As such, the first audio sound generated by the audio source $500.1$ and the second audio sound generated by the audio source $500.x$ should be substantially similar to each other at most, if not all, locations within the real-world venue.

Exemplary Virtual Venue that can be Accessed by the Exemplary Audio De-Mixing Tool FIG. 6 graphically illustrates an exemplary virtual venue that can be accessed by the exemplary audio re-mixing tool in accordance with some exemplary embodiments of the present disclosure. As described herein, an audio re-mixing tool, such as the audio re-mixing tool 154, can intelligently construct an audio presentation to playback a composite audio program, such as the composite audio program 150, on real-world loudspeakers within a real-world venue, such as the real-world venue. As described herein, the audio re-mixing tool can access a virtual representation of the real-world venue in three-dimensional space, also referred to as a virtual venue 600, which virtually identifies three-dimensional coordinates of the real-world loudspeakers within the three-dimensional space. Although the virtual venue 600 is illustrated in FIG. 6 as being in the three-dimensions within the three-dimensional space, those skilled in the relevant art(s) will recognize that the virtual venue 600 can similarly be in two-dimensions within two-dimensional space without departing from the spirit and scope of the present disclosure. And as described herein, the audio re-mixing tool can utilize the virtual venue 600 to assign audio sounds of the composite audio program, such as the audio sounds 156.1 through 156.n of the composite audio program 150, to the real-world loudspeakers within the real-world venue to construct an audio presentation to playback the composite audio program within the real-world venue.

As illustrated in FIG. 6, the virtual venue 600 includes virtual loudspeakers 602.1 through 602.k that are situated within the three-dimensional space of the virtual venue 600. However, the configuration and arrangement of the virtual loudspeakers 602.1 through 602.k within the three-dimensional space of the virtual venue 600 as illustrated in FIG. 6 is for illustrative purposes and are not intended to be limiting. Those skilled in the relevant art(s) will recognize that the real-world loudspeakers 602.1 through 602.k can be configured and arranged differently within the three-dimensional space of the virtual venue 600 without departing from the spirit and scope of the present disclosure. In some embodiments, the virtual loudspeakers 602.1 through 602.k can be positioned at three-dimensional coordinates $(x_1, y_1, z_1)$ through $(x_k, y_k, z_k)$, respectively, within the three-dimensional space of the virtual venue 600. In some embodiments, the virtual loudspeakers 602.1 through 602.k can represent virtual representations of real-world loudspeakers within a real-world venue, such as the real-world venue 102, virtual representations of virtual loudspeakers within the real-world venue, and/or any combination of real-world loudspeakers or virtual loudspeakers within the real-world venue. In these embodiments, the virtual representations of the real-world loudspeakers can include a proscenium virtual loudspeaker system 604 that is situated at, or near, a proscenium of the virtual venue 600, effects extensions virtual array real-world loudspeaker systems 608.1 through 608.l that are situated at, or near, the proscenium virtual loudspeaker system 604, and/or environmental virtual array real-world loudspeaker systems 610.1 through 610.m that are situated throughout the virtual venue 600. In these embodiments, the proscenium virtual loudspeaker system 604 can include virtual loudspeakers 606.1 through 606.z. In some embodiments, the virtual loudspeakers 606.1 through 606.z, the effects extensions virtual array real-world loudspeaker systems 608.1 through 608.l, and/or the environmental virtual array real-world loudspeaker systems 610.1 through 610.m can include one or more virtual super tweeters, one or more virtual tweeters, one or more virtual mid-range speakers, one or more virtual woofers, one or more virtual subwoofers, and/or one or more virtual full-range speakers to provide some examples.

Exemplary Static Audio Presentations that can be Constructed by the Exemplary Audio De-Mixing Tool The exemplary static audio presentations to be described in further detail below in FIG. 7A through FIG. 7F represent audio presentations whereby assignments of audio sounds of a composite audio program, such as the audio sounds 156.1 through 156.n of the composite audio program 150, to real-world loudspeakers within a real-world venue, such as the real-world venue 102, remains fixed, or static, throughout the composite audio program. Whereas exemplary dynamic audio presentations to be described herein in FIG. 8A through FIG. 8B represent audio presentations whereby assignments of the audio sounds of the composite audio program to the real-world loudspeakers within the real-world venue dynamically moves, changes, or switches during the composite audio program.

Figure 7A:
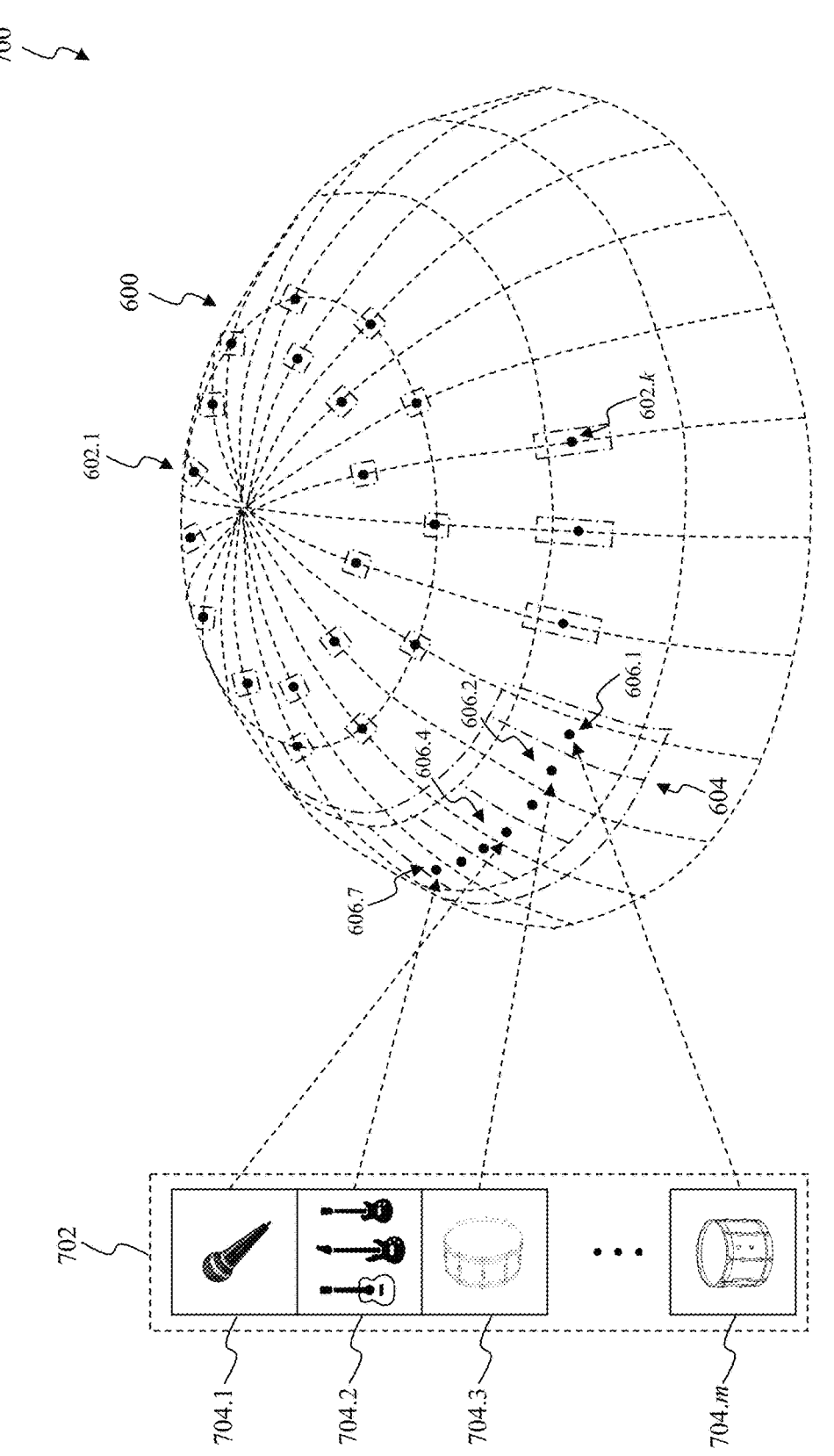

FIG. 7A through FIG. 7F graphically illustrate operations of the exemplary audio re-mixing tool in constructing an exemplary static audio presentation to playback a composite audio program on real-world loudspeakers within the exemplary real-world venue in accordance with some exemplary embodiments of the present disclosure. In the exemplary embodiment of illustrated in FIG. 7A, an audio re-mixing tool, such as the audio re-mixing tool 154, can intelligently construct a static audio presentation 700 to playback a composite audio program on real-world loudspeakers within a real-world venue, such as the real-world venue 102. As described herein, the audio re-mixing tool can utilize the virtual venue 600 to assign audio sounds of the composite audio program, such as the audio sounds 156.1 through 156.n of the composite audio program 150, to the real-world loudspeakers within the real-world venue to construct the static audio presentation 700. Those skilled in the relevant art(s) will recognize that the static audio presentation 700 as illustrated in FIG. 7A is for illustrative purposes and is not intended to be limiting. Those skilled in the relevant art(s) will recognize that the audio re-mixing tool can intelligently construct other static audio presentations to playback other composite audio programs on real-world loudspeakers within the real-world venue without departing from the spirit and scope of the present disclosure.

The discussion of FIG. 7A through FIG. 7F to follow is to describe exemplary operations that can be utilized by the audio re-mixing tool to construct the static audio presentation 700 to playback the composite audio program on the real-world loudspeakers within the real-world venue. Those skilled in the relevant art(s) will recognize that these operations can be performed independently, or in any combination, to construct other static audio presentations to playback other composite audio programs on real-world loudspeakers within the real-world venue without departing from the spirit and scope of the present disclosure. In the exemplary embodiment illustrated in FIG. 7A, the audio re-mix can access an electronic library of audio sounds 702 having audio sounds 704.1 through 704.*m* that are present within the composite audio program. In some embodiments, an audio de-mixing tool, such as the audio de-mixing tool 152, can seamlessly deconstruct the composite audio program to identify the audio sounds 704.1 through 704.*m*. As illustrated in FIG. 7A, the audio sounds 704.1 through 704.*m* can include audio sounds generated by one or more audio sources, such as one or more electronic, mechanical, and/or electro-mechanical devices, one or more non-human organisms, and/or one or more human organisms, among others, as described herein. For example, the audio sounds 704.1 through 704.*m* can include an audio sound 704.1 that is generated by the microphone, an audio sound 704.2 that is generated by the acoustic guitar, the electric guitar, and the bass guitar, an audio sound 704.3 that is generated by the bass drum, an audio sound 704.*m* that is generated by the snare drum, among others.

In the exemplary embodiment illustrated in FIG. 7A, the audio re-mixing tool can assign the audio sounds 704.1 through 704.*m* to the virtual loudspeakers 602.1 through 602.*k* within the virtual venue 600 to construct the static audio presentation 700 to playback the composite audio program on the real-world loudspeakers within the real-world venue. As described herein, the virtual venue 600 can include the proscenium virtual loudspeaker system 604 having the virtual loudspeakers 606.1 through 606.*z*, the effects extensions virtual array real-world loudspeaker systems 608.1 through 608.*l*, and/or the environmental virtual array real-world loudspeaker systems 610.1 through 610.*m*. As illustrated in FIG. 7A, the audio re-mixing tool can assign the audio sound 704.1 that is generated by the microphone to a virtual loudspeaker 606.4 from among the proscenium virtual loudspeaker system 604, the audio sound 704.2 that is generated by the acoustic guitar, the electric guitar, and the bass guitar to a virtual loudspeaker 606.7 from among the proscenium virtual loudspeaker system 604, the audio sound 704.3 that is generated by the bass drum to a virtual loudspeaker 606.2 from among the proscenium virtual loudspeaker system 604, and/or the audio sound 704.*m* that is generated by the snare drum to a virtual loudspeaker 606.1 from among the proscenium virtual loudspeaker system 604 to construct the static audio presentation 700. Those skilled in the relevant art(s) will recognize that the assignment of the audio sounds 704.1 through 704.*m* to the virtual loudspeakers 602.1 through 602.*k* within the virtual venue 600 as illustrated in FIG. 7A is for illustrative purposes and are not intended to be limiting. Those skilled in the relevant art(s) will recognize that the audio re-mixing tool can assign the audio sounds 704.1 through 704.*m* to other virtual loudspeakers 602.1 through 602.*k* within the virtual venue 600 to construct the static audio presentation 700 without departing from the spirit and scope of the present disclosure.

The discussion of FIG. 7B through FIG. 7F to follow is to describe exemplary operations to be performed by the audio re-mixing tool to assign the audio sounds 704.1 through 704.*m* to the virtual loudspeakers 602.1 through 602.*k* within the virtual venue 600 as illustrated in FIG. 7A. In some embodiments, the exemplary operations to be described in further detail below in FIG. 7B through FIG. 7D and/or the exemplary operations to be described in further detail below in FIG. 8A through FIG. 8B can form, or be included within, a software re-mixing toolkit that can be utilized by the audio re-mixing tool to construct the exemplary audio presentations described herein, for example, the static audio presentation 700. In these embodiments, the exemplary operations within the software re-mixing toolkit can be performed independently, or in any combination, to construct these audio presentations.

Figure 7B:
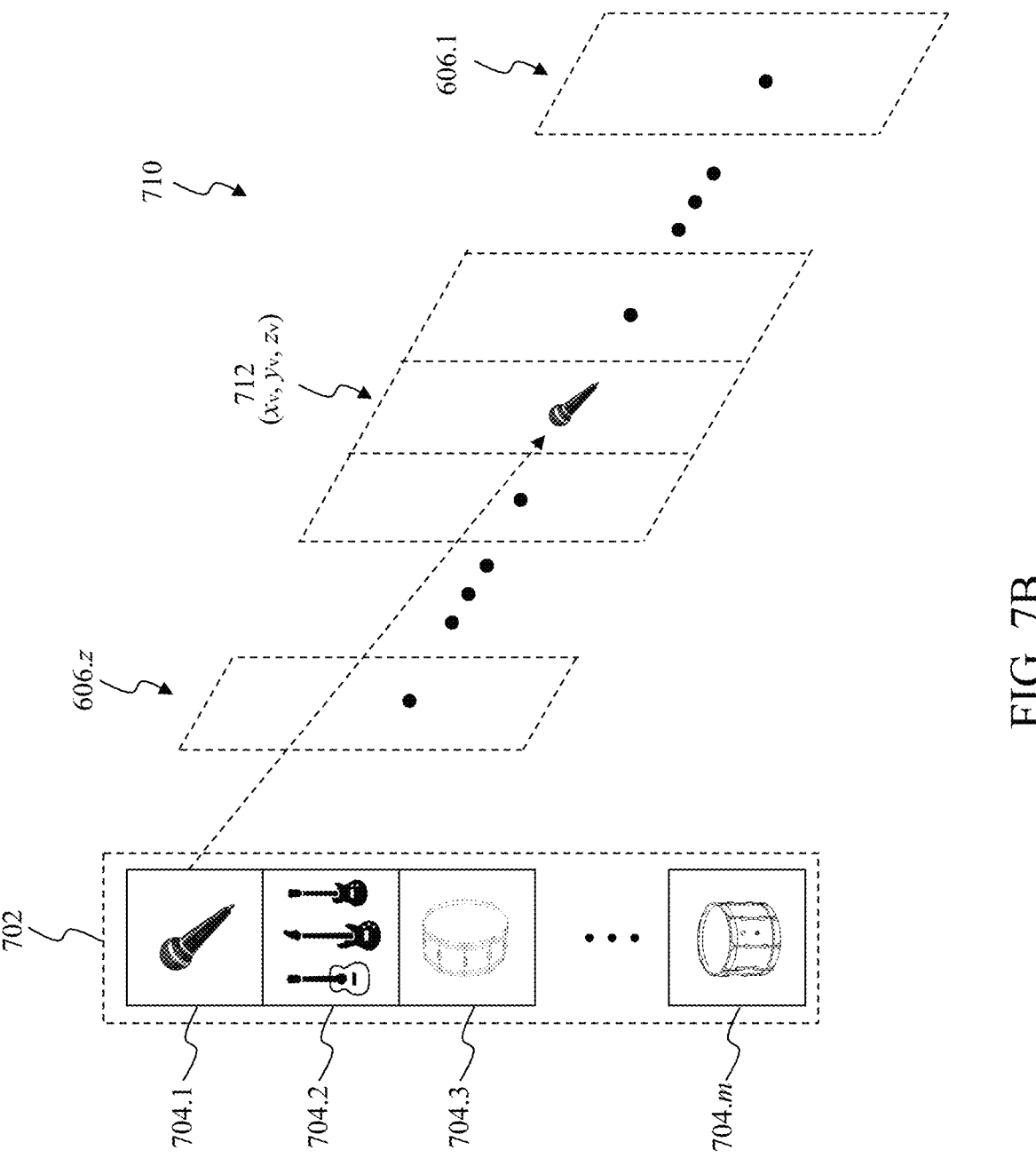

FIG. 7B graphically illustrates a simple musical instrument assignment operation 710 that can be performed by the audio re-mixing tool to assign an audio sound that is generated by a simple musical instrument, such as a percussion instrument, a wind instrument, a string instrument, and/or an electronic instrument, to the virtual loudspeakers 602.1 through 602.*k* within the virtual venue 600. Generally, the audio sound that is generated by the simple musical instrument as illustrated in FIG. 7B represents an audio sound having different characteristics, parameters, and/or attributes from other audio sounds from among the audio sounds 704.1 through 704.*m*. In some embodiments, the audio sound that is generated by the simple musical instrument has dissimilar pitches, loudness, timbres, frequencies, amplitudes, wavelengths, and/or velocities to provide some examples from the other audio sounds from among the audio sounds 704.1 through 704.*m*. In the exemplary embodiment illustrated in FIG. 7B, the audio re-mixing tool can assign the audio sound that is generated by the simple musical instrument, such as the audio sound 704.1 that is generated by the microphone to provide an example, to a virtual loudspeaker 712 from among the virtual loudspeakers 606.1 through 606.*z*. In some embodiments, the virtual loudspeaker 712 can be selected from among the virtual loudspeakers 606.1 through 606.*z* based upon a composite audio program, such as the composite audio program 150, being played back by the virtual venue 600. In some embodiments, the virtual loudspeaker 712 can be selected from among the virtual loudspeakers 606.1 through 606.*z* through algorithmic best source decoding for the virtual loudspeakers 606.1 through 606.*z*. In these embodiments, the algorithmic best source decoding will be apparent to those skilled in the relevant art(s) without departing from the spirit and scope of the present disclosure. Although the audio sound that is generated by the simple musical instrument is described as being assigned to the virtual loudspeaker 712 in FIG. 7B, those skilled in the relevant art(s) will recognize that the audio sound that is generated by the simple musical instrument can be assigned to any of the virtual loudspeakers 602.1 through 602.*k* within the virtual venue 600 in a substantially similar manner as described in FIG. 7B without departing from the sprit and scope of the present disclosure. In some embodiments, the virtual loudspeaker 712 can be positioned at a three-dimensional coordinate $(x_v, y_v, z_v)$ within the three-dimensional space of the virtual venue 600. As described herein, the three-dimensional coordinate $(x_v, y_v, z_v)$ can be characterized as providing a frame of reference, or virtual coordinate system, for the virtual loudspeaker 712 within the virtual venue 600.

Figure 7C:
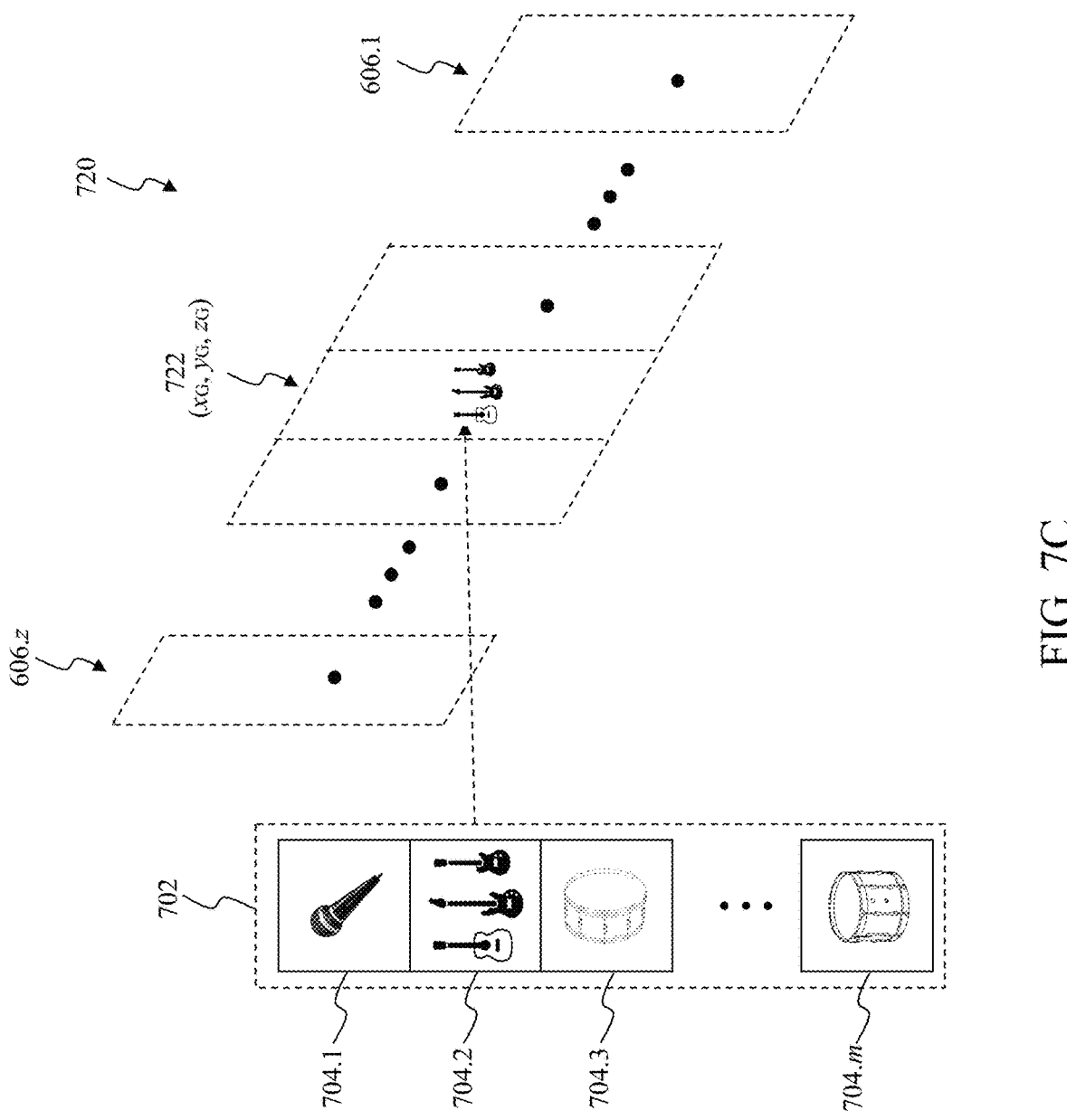

FIG. 7C graphically illustrates a collection of musical instruments assignment operation 720 that can be performed by the audio re-mixing tool to assign an audio sound that is generated by a collection of musical instruments, such as musical instruments from the same classification of musical instruments, such as percussion instruments, wind instruments, string instruments, and/or electronic instruments to provide some examples and/or from different classifications of musical instruments, to the virtual loudspeakers 602.1 through 602.$k$ within the virtual venue 600. Generally, the audio sound that is generated by the collection of musical instruments as illustrated in FIG. 7C represents an audio sound having different characteristics, parameters, and/or attributes from other audio sounds from among the audio sounds 704.1 through 704.$m$. In some embodiments, the audio sound that is generated by the collection of musical instruments has dissimilar pitches, loudness, timbres, frequencies, amplitudes, wavelengths, and/or velocities to provide some examples from the other audio sounds from among the audio sounds 704.1 through 704.$m$. In the exemplary embodiment illustrated in FIG. 7C, the audio re-mixing tool can assign the audio sound that is generated by the collection of musical instruments, such as the audio sound 704.2 that is generated by the acoustic guitar, the electric guitar, and the bass guitar to provide an example, to a virtual loudspeaker 722 from among the virtual loudspeakers 606.1 through 606.$z$. In some embodiments, the virtual loudspeaker 722 can be selected from among the virtual loudspeakers 606.1 through 606.$z$ based upon a composite audio program, such as the composite audio program 150, being played back by the virtual venue 600. In some embodiments, the virtual loudspeaker 722 can be selected from among the virtual loudspeakers 606.1 through 606.$z$ through algorithmic best source decoding for the virtual loudspeakers 606.1 through 606.$z$. In these embodiments, the algorithmic best source decoding will be apparent to those skilled in the relevant art(s) without departing from the spirit and scope of the present disclosure Although the audio sound that is generated by the collection of musical instruments are described as being assigned to the virtual loudspeaker 722 in FIG. 7C, those skilled in the relevant art(s) will recognize that the audio sound that is generated by the collection of musical instruments can be assigned to any of the virtual loudspeakers 602.1 through 602.$k$ within the virtual venue 600 in a substantially similar manner as described in FIG. 7C without departing from the sprit and scope of the present disclosure. In some embodiments, the virtual loudspeaker 722 can be positioned at a three-dimensional coordinate $(x_G, y_G, z_G)$ within the three-dimensional space of the virtual venue 600. As described herein, the three-dimensional coordinate $(x_G, y_G, z_G)$ can be characterized as providing a frame of reference, or virtual coordinate system, for the virtual loudspeaker 722 within the virtual venue 600.

Figure 7D:
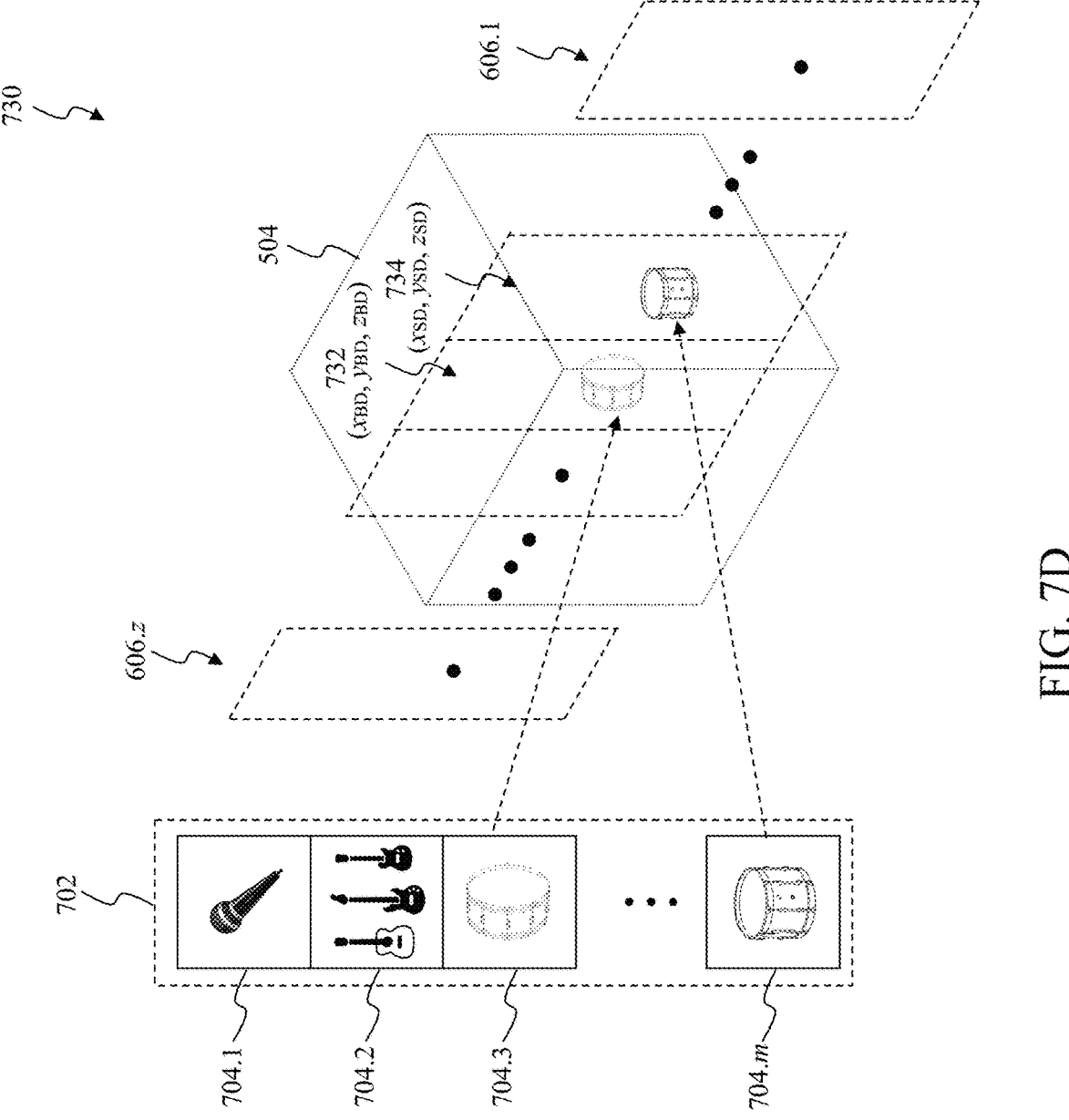

FIG. 7D graphically illustrates an audio sound ensemble assignment operation 730 that can be performed by the audio re-mixing tool to assign audio sounds that are generated by an audio sound ensemble having a collection of musical instruments, such as musical instruments from the same classification of musical instruments, such as percussion instruments, wind instruments, string instruments, and/or electronic instruments to provide some examples and/or from different classifications of musical instruments, to the virtual loudspeakers 602.1 through 602.$k$ within the virtual venue 600. Generally, the audio sounds that are generated by the audio sound ensemble represents audio sounds from among the audio sounds 704.1 through 704.$m$ having similar characteristics, parameters, and/or attributes as one another. In some embodiments, the audio sounds that are generated by the audio sound ensemble have similar pitches, loudness, timbres, frequencies, amplitudes, wavelengths, and/or velocities to provide some examples as one another. In the exemplary embodiment illustrated in FIG. 7D, the audio re-mixing tool can assign the audio sound that is generated by a simple musical instrument, such as the audio sound 704.3 that is generated by the bass drum to provide an example, from among the audio sound ensemble to a virtual loudspeaker 732 from among the virtual loudspeakers 606.1 through 606.$z$ in a substantially similar manner as described herein. Although the audio sound that is generated by the simple musical instrument is described as being assigned to the virtual loudspeaker 712 in FIG. 7D, those skilled in the relevant art(s) will recognize that the audio sound that is generated by the simple musical instrument can be assigned to any of the virtual loudspeakers 602.1 through 602.$k$ within the virtual venue 600 in a substantially similar manner as described in FIG. 7D without departing from the sprit and scope of the present disclosure. Thereafter, the audio re-mixing tool can analyze the audio sounds 704.1 through 704.$m$ to identify another audio sound that is generated by another simple musical instrument, such as the audio sound 704.$m$ that is generated by the snare drum to provide an example, has similar characteristics, parameters, and/or attributes as the audio sound that is generated by the simple musical instrument such as the audio sound 704.3 that is generated by the bass drum to provide an example. In some embodiments, the audio re-mixing tool can access the ensemble bounding volume 504 as described herein that outlines spatial distances between the simple musical instrument and the other simple musical instrument within the three-dimensional space of the virtual venue 600. After accessing the ensemble bounding volume 504, the audio re-mixing tool can assign the audio sound that is generated by the other simple musical instrument, such as the audio sound 704.$m$ that is generated by the snare drum to provide an example, from among the audio sound ensemble to a virtual loudspeaker 734 that is spatial position within the ensemble bounding volume 504 from among the virtual loudspeakers 606.1 through 606.$z$ in a substantially similar manner as described herein. In some embodiments, the virtual loudspeaker 732 and the virtual loudspeaker 734 can be positioned at a three-dimensional coordinate $(x_{BD}, y_{BD}, z_{BD})$ and a three-dimensional coordinate $(x_{SD}, y_{SD}, z_{SD})$, respectively, within the three-dimensional space of the virtual venue 600. As described herein, the three-dimensional coordinate $(x_{BD}, y_{BD}, z_{BD})$ and a three-dimensional coordinate $(x_{SD}, y_{SD}, z_{SD})$ can be characterized as providing a frame of reference, or virtual coordinate system, for the virtual loudspeaker 732 and the virtual loudspeaker 734, respectively, within the virtual venue 600. In some embodiments, the audio re-mixing tool can estimate a distance between the audio sound that is generated by the simple musical instrument, such as the audio sound 704.3 that is generated by the bass drum to provide an example, and the audio sound that is generated by the other simple musical instrument, such as the audio sound 704.$m$ that is generated by the snare drum to provide an example, namely, a distance between the three-dimensional coordinate $(x_{BD}, y_{BD}, z_{BD})$ and the three-dimensional coordinate $(x_{SD}, y_{SD}, z_{SD})$ within the three-dimensional space of the virtual venue 600. In these embodiments, the audio re-mixing tool can compare this distance with the ensemble bounding volume 504 to verify that the audio sound that is generated by the simple musical instrument and the audio sound that is generated by the other simple musical instrument are within the confines of the ensemble bounding volume 504.

Figure 7E:
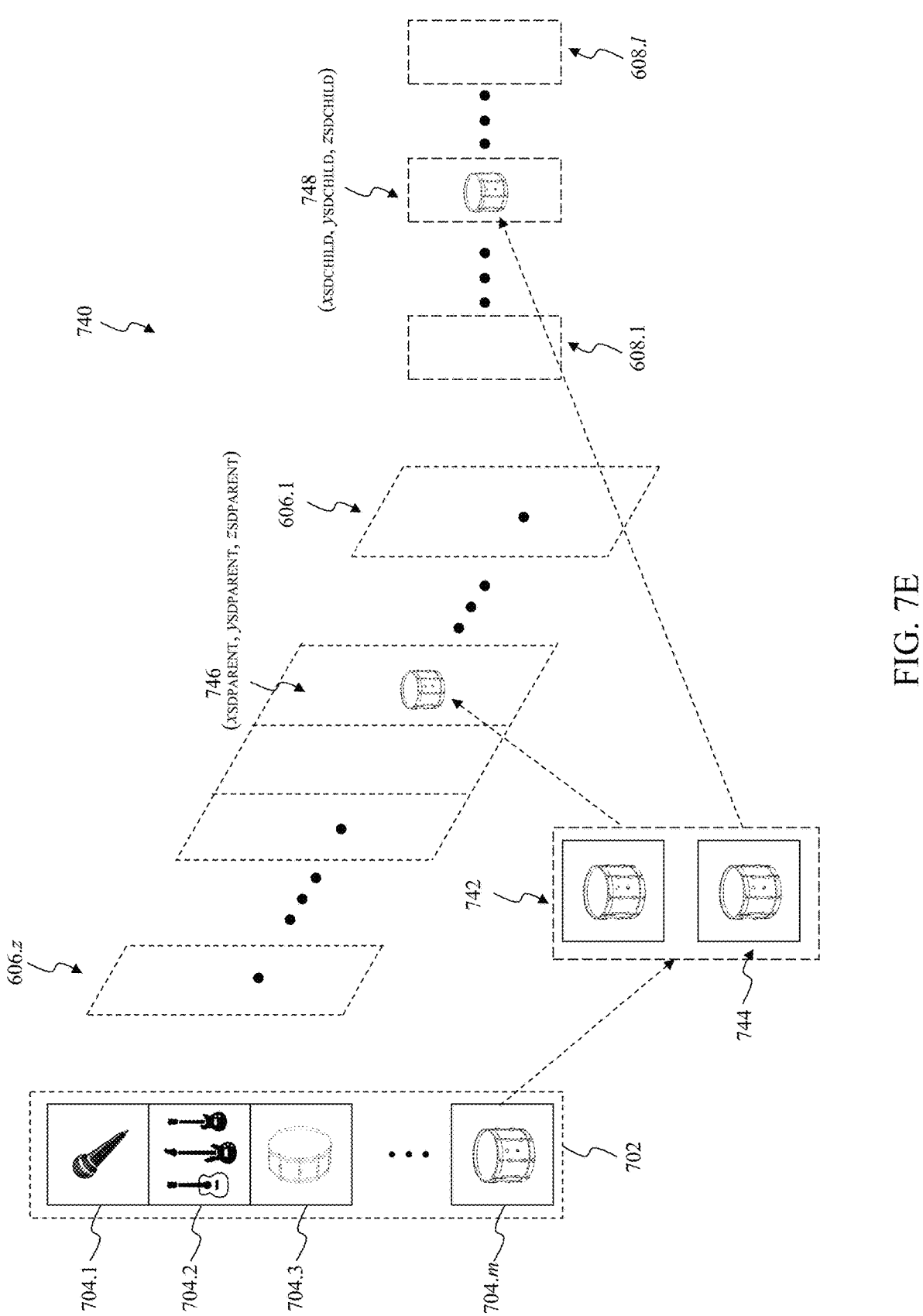
Figure 7F:
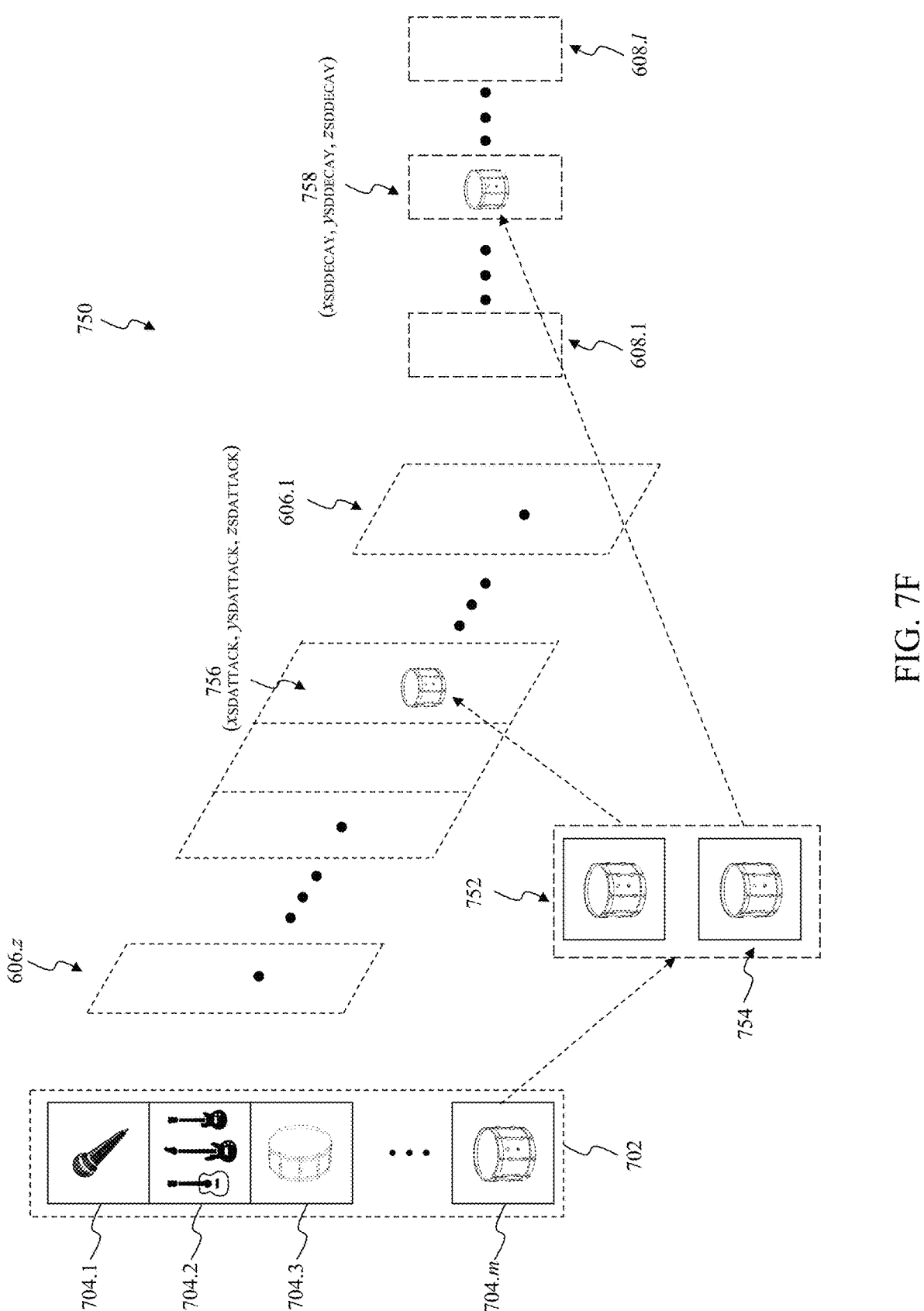

As described herein in FIG. 7E and FIG. 7F, one or more characteristics, parameters, and/or attributes of the audio sounds 704.1 through 704.*m* can influence the assignment of the audio sounds 704.1 through 704.*m* to the virtual loudspeakers 602.1 through 602.*k* within the virtual venue 600. In some embodiments, the one or more characteristics, parameters, and/or attributes can indicate spatial positioning between audio sources, such as one or more of the electronic, mechanical, and/or electro-mechanical devices, one or more non-human organisms, and/or one or more human organisms, among others, that generated the audio sounds 704.1 through 704.*m*, audio transients of the audio sounds 704.1 through 704.*m*, spatial movement of audio sources that generated the audio sounds 704.1 through 704.*m*, timing relationships between the audio sounds 704.1 through 704.*m*, audio effects within the audio sounds 704.1 through 704.*m*, and/or any other suitable characteristic, parameter, and/or attribute of, or between, the audio sounds 704.1 through 704.*m* that will be recognized by those skilled in the relevant art(s) without departing from the spirit and scope of the present disclosure.

In some embodiments, the audio re-mixing tool can access the one or more characteristics, parameters, and/or attributes of the audio sounds 704.1 through 704.*m*. In these embodiments, the audio re-mixing tool can analyze the audio sounds 704.1 through 704.*m* to identify one or more characteristics, parameters, and/or attributes of these audio sounds in a substantially similar manner as described herein. Alternatively, or in addition to, the audio re-mixing tool can access the database as described herein to retrieve the one or more characteristics, parameters, and/or attributes of the audio sounds 704.1 through 704.*m*. And after accessing the one or more characteristics, parameters, and/or attribute, the audio re-mixing tool can assign the assign audio sounds that are generated by the collection of musical instruments in accordance with these characteristics, parameters, and/or attributes of the audio sounds 704.1 through 704.*m* to the virtual loudspeakers 602.1 through 602.*k* within the virtual venue 600.

FIG. 7E graphically illustrates an audio effects operation 740 that can be performed by the audio re-mixing tool to assign an audio sound that is generated by a simple musical instrument, such as a percussion instrument, a wind instrument, a string instrument, and/or an electronic instrument, and/or a collection of musical instruments, such as musical instruments from the same classification of musical instruments, such as percussion instruments, wind instruments, string instruments, and/or electronic instruments to provide some examples and/or from different classifications of musical instruments, to the virtual loudspeakers 602.1 through 602.*k* within the virtual venue 600. As described herein, the audio re-mixing tool can access the one or more characteristics, parameters, and/or attributes of the audio sounds 704.1 through 704.*m*, such as audio effects within the audio sounds 704.1 through 704.*m* to provide an example. Alternatively, or in addition to, the audio re-mixing tool can analyze the audio sounds 704.1 through 704.*m* to identify the one or more characteristics, parameters, and/or attributes of the audio sounds 704.1 through 704.*m* in a substantially similar manner as described herein. In the exemplary embodiment illustrated in FIG. 7E, the audio re-mixing tool can isolate the audio sounds being generated by the simple musical instrument and/or the collection of musical instruments, referred to as parent audio sounds, from audio effects within the audio sounds 704.1 through 704.*m*, referred to as child audio sounds. In some embodiments, these audio effects can include one or more echoes, flangers, phasers, choruses, equalizations, filterings, overdrives, pitch shifts, time stretches, resonators, voice effects, synthesizers, modulations, compressions, and/or the like to provide some examples. As illustrated in FIG. 7E, the audio re-mixing tool can isolate the audio sounds from among the audio sound 704.*m* that are generated by the snare drum, referred to as a parent audio sound 742 in FIG. 7E, from audio effects within the audio sound 704.*m* that are generated by the snare drum, referred to as a child audio sound 744 in FIG. 7E.

After isolating the parent audio sounds and the child audio sounds, the audio re-mixing tool can identify a parent-child real-world loudspeaker pairing from among the virtual loudspeakers 602.1 through 602.*k* within the virtual venue 600. In some embodiments, the parent-child real-world loudspeaker pairing can include virtual loudspeaker 746 from among the virtual loudspeakers 606.1 through 606.*z* that is associated with an effects extensions virtual array real-world loudspeaker system 748 from among the effects extensions virtual array real-world loudspeaker systems 608.1 through 608.*l*. In some embodiments, the audio re-mixing tool can utilize a predetermined set of source separation rules to identify the parent-child real-world loudspeaker pairing. In these embodiments, these source separation rules can be based upon the transient and/or diffused audio sounds within the parent audio sounds and/or the child audio sounds. For example, the parent-child real-world loudspeaker pairing can be based upon the diffused audio sounds within the parent audio sounds and/or the child audio sounds. In some embodiments, the predetermined set of source separation rules preferably maintains the angular and/or the distance relationships between the parent audio sounds and the child audio sounds to the best of the ability.

In the exemplary embodiment illustrated in FIG. 7E, the audio re-mixing tool can assign the parent audio sounds that are generated by the simple musical instrument and/or the collection of musical instruments, such as the parent audio sound 742, to the virtual loudspeaker 746 from among the virtual loudspeakers 606.1 through 606.*z* and the audio re-mixing tool can assign the child audio sounds that are generated by the simple musical instrument and/or the collection of musical instruments, such as the child audio sound 744, to the effects extensions virtual array real-world loudspeaker system 748 from among the effects extensions virtual array real-world loudspeaker systems 608.1 through 608.*l*. Although the parent audio sounds that are generated by the simple musical instrument and/or the collection of musical instruments are described as being assigned to the virtual loudspeaker 746 and the child audio sounds that are generated by the simple musical instrument and/or the collection of musical instruments are described as being assigned to the effects extensions virtual array real-world loudspeaker system 748 in FIG. 7E, those skilled in the relevant art(s) will recognize that the parent audio sounds and/or the child audio sounds can be assigned to any of the virtual loudspeakers 602.1 through 602.*k* within the virtual venue 600 in a substantially similar manner as described in FIG. 7E without departing from the sprit and scope of the present disclosure. In some embodiments, the virtual loudspeaker 746 and the effects extensions virtual array real-world loudspeaker system 748 can be positioned at a three-dimensional coordinate $(x_{SDPARENT}, y_{SDPARENT}, z_{SDPARENT})$ and a three-dimensional coordinate $(X_{SDCHILD}, y_{SDCHILD}, z_{SDCHILD})$, respectively, within the three-dimensional space of the virtual venue 600. As described herein, the three-dimensional coordinate $(x_{SDPARENT}, y_{SDPARENT}, z_{SDPARENT})$ and the three-dimensional coordinate $(X_{SDCHILD}, y_{SDCHILD}, z_{SDCHILD})$ can be characterized as providing a frame of reference, or virtual coordinate system, for the virtual loud-speaker 746 and the effects extensions virtual array real-world loudspeaker system 748, respectively.

FIG. 7F graphically illustrates an audio transient operation 750 that can be performed by the audio re-mixing tool to assign an audio sound that is generated by a simple musical instrument, such as a percussion instrument, a wind instrument, a string instrument, and/or an electronic instrument, and/or a collection of musical instruments, such as musical instruments from the same classification of musical instruments, such as percussion instruments, wind instruments, string instruments, and/or electronic instruments to provide some examples and/or from different classifications of musical instruments, to the virtual loudspeakers 602.1 through 602.$k$ within the virtual venue 600. As described herein, the audio re-mixing tool can access the one or more characteristics, parameters, and/or attributes of the audio sounds 704.1 through 704.$m$, such as audio transients of the audio sounds 704.1 through 704.$m$ to provide an example. Alternatively, or in addition to, the audio re-mixing tool can analyze the audio sounds 704.1 through 704.$m$ to identify the one or more characteristics, parameters, and/or attributes of the audio sounds 704.1 through 704.$m$ in a substantially similar manner as described herein.

In the exemplary embodiment illustrated in FIG. 7E, the audio re-mixing tool can isolate the attack transients from among the audio sounds 704.1 through 704.$m$ and the decay transients from among the audio sounds 704.1 through 704.$m$. As illustrated in FIG. 7F, the audio re-mixing tool can isolate the attack transients from among the audio sound 704.$m$ that are generated by the snare drum, referred to as an attack transient audio sound 752 in FIG. 7F, and the decay transients from among the audio sound 704.$m$ that are generated by the snare drum, referred to as a decay transient audio sound 754 in FIG. 7F. In some embodiments, the attack transient audio sound 752 indicates first durations in time for the snare drum to reach its maximum amplitudes and the decay transient audio sound 754 indicates second durations in time for the snare drum to decrease from its maximum amplitudes to its steady state amplitudes.

After isolating the attack transients and the decay transients, the audio re-mixing tool can identify an attack-decay real-world loudspeaker pairing from among the virtual loudspeakers 602.1 through 602.$k$ within the virtual venue 600. In some embodiments, the attack-decay real-world loudspeaker pairing can include a virtual loudspeaker 756 from among the virtual loudspeakers 606.1 through 606.$z$ that is associated with an effects extensions virtual array real-world loudspeaker system 758 from among the effects extensions virtual array real-world loudspeaker systems 608.1 through 608.$l$.

In the exemplary embodiment illustrated in FIG. 7F, the audio re-mixing tool can assign the attack transients that are generated by the simple musical instrument and/or the collection of musical instruments, such as the attack transient audio sound 752, to the virtual loudspeaker 756 from among the virtual loudspeakers 606.1 through 606.$z$ and the audio re-mixing tool can assign the decay transients that are generated by the simple musical instrument and/or the collection of musical instruments, such as the decay transient audio sound 754, to the effects extensions virtual array real-world loudspeaker system 758 from among the effects extensions virtual array real-world loudspeaker systems 608.1 through 608.$l$. Although the attack transients that are generated by the simple musical instrument and/or the collection of musical instruments are described as being assigned to the virtual loudspeaker 756 and the decay transients that are generated by the simple musical instrument and/or the collection of musical instruments are described as being assigned to the effects extensions virtual array real-world loudspeaker system 758 in FIG. 7F, those skilled in the relevant art(s) will recognize that the attack audio sounds and/or the decay audio sounds can be assigned to any of the virtual loudspeakers 602.1 through 602.$k$ within the virtual venue 600 in a substantially similar manner as described in FIG. 7F without departing from the sprit and scope of the present disclosure. In some embodiments, the virtual loudspeaker 756 and the effects extensions virtual array real-world loudspeaker system 758 can be positioned at a three-dimensional coordinate ($x_{SDATTACK}$, $y_{SDATTACK}$, $z_{SDATTACK}$) and a three-dimensional coordinate ($x_{SDDECAY}$, $y_{SDDECAY}$, $z_{SDDECAY}$), respectively, within the three-dimensional space of the virtual venue 600. As described herein, the three-dimensional coordinate ($x_{SDATTACK}$, $y_{SDATTACK}$, $z_{SDATTACK}$) and the three-dimensional coordinate ($x_{SDDECAY}$, $y_{SDDECAY}$, $z_{SDDECAY}$) can be characterized as providing a frame of reference, or virtual coordinate system, for the virtual loudspeaker 756 and the effects extensions virtual array real-world loudspeaker system 758, respectively.

Although not illustrated in FIG. 7A through FIG. 7F, one or more characteristics, parameters, and/or attributes of the real-world venue, such as the seating arrangement within the real-world venue, the location of the performance stage within the real-world venue, and/or the location of the real-world loudspeakers within the real-world venue, can influence the assignment of the audio sounds 704.1 through 704.$m$ to the virtual loudspeakers 602.1 through 602.$k$ within the virtual venue 600. For example, the assignment of the audio sounds 704.1 through 704.$m$ to the virtual loudspeakers 602.1 through 602.$k$ within the virtual venue 600 can be based on time domain, volume level, evenness of coverage, and frequency bandwidth tempered by the analyses of the original positioning intention of the artist. In some embodiments, the seating arrangement within the real-world venue can dictate the amount of influence on the assignment of the audio sounds 704.1 through 704.$m$ to the virtual loudspeakers 602.1 through 602.$k$ within the virtual venue 600. In some embodiments, the assignment of the audio sounds 704.1 through 704.$m$ to the virtual loudspeakers 602.1 through 602.$k$ within the virtual venue 600 can be determined by creative artistic intent, transient properties of the content, and temporal relationship of the content against other content elements.

Exemplary Dynamic Audio Presentations that can be Constructed by the Exemplary Audio De-Mixing Tool FIG. 8A through FIG. 8B graphically illustrate operations of the exemplary audio re-mixing tool in constructing an exemplary dynamic audio presentation to playback the composite audio program on real-world loudspeakers within the exemplary real-world venue in accordance with some exemplary embodiments of the present disclosure. In the exemplary embodiment of illustrated in FIG. 8A, an audio re-mixing tool, such as the audio re-mixing tool 154, can intelligently construct a dynamic audio presentation 800 to playback a composite audio program on real-world loudspeakers within a real-world venue, such as the real-world venue 102 as described herein. As described herein, the audio re-mixing tool can utilize the virtual venue 600, as described herein, to assign audio sounds of the composite audio program, such as the audio sounds 156.1 through 156.$n$ of the composite audio program 150 as described herein, to the real-world loudspeakers within the real-world venue to construct the dynamic audio presentation 800.

Those skilled in the relevant art(s) will recognize that the dynamic audio presentation 800 as illustrated in FIG. 8A is for illustrative purposes and are not intended to be limiting. Those skilled in the relevant art(s) will recognize that the audio re-mixing tool can intelligently construct other dynamic audio presentations to playback other composite audio programs on real-world loudspeakers within the real-world venue without departing from the spirit and scope of the present disclosure.

The discussion of FIG. 8A through FIG. 8B to follow is to describe exemplary operations that can be utilized by the audio re-mixing tool to construct the dynamic audio presentation 800 to playback the composite audio program on the real-world loudspeakers within the real-world venue. Those skilled in the relevant art(s) will recognize that these operations can be performed independently, or in any combination, to construct other dynamic audio presentations to playback other composite audio programs on real-world loudspeakers within the real-world venue without departing from the spirit and scope of the present disclosure.

In the exemplary embodiment illustrated in FIG. 8A, the audio re-mix can access the electronic library of audio sounds 702 having the audio sounds 704.1 through 704.m that are present within the composite audio program in a substantially similar manner as described herein. Thereafter, the audio re-mixing tool can assign the audio sounds 704.1 through 704.m to the virtual loudspeakers 602.1 through 602.k within the virtual venue 600 to construct the dynamic audio presentation 800 to playback the composite audio program on the real-world loudspeakers within the real-world venue. As described herein, the virtual venue 600 can include the proscenium virtual loudspeaker system 604 having the virtual loudspeakers 606.1 through 606.z, the effects extensions virtual array real-world loudspeaker systems 608.1 through 608.l, and/or the environmental virtual array real-world loudspeaker systems 610.1 through 610.m. As illustrated in FIG. 8A, the audio re-mixing tool can assign the audio sound 704.1 that is generated by the microphone to a virtual loudspeaker 606.4 from among the proscenium virtual loudspeaker system 604, the audio sound 704.2 that is generated by the acoustic guitar, the electric guitar, and the bass guitar to a virtual loudspeaker 606.7 from among the proscenium virtual loudspeaker system 604, the audio sound 704.3 that is generated by the bass drum to a virtual loudspeaker 606.2 from among the proscenium virtual loudspeaker system 604, and/or the audio sound 704.m that is generated by the snare drum to a virtual loudspeaker 606.1 from among the proscenium virtual loudspeaker system 604 in a substantially manner as described herein through 7F to construct the dynamic audio presentation 800. Those skilled in the relevant art(s) will recognize that the assignment of the audio sounds 704.1 through 704.m to the virtual loudspeakers 602.1 through 602.k within the virtual venue 600 as illustrated in FIG. 8A is for illustrative purposes and are not intended to be limiting. Those skilled in the relevant art(s) will recognize that the audio re-mixing tool can assign the audio sounds 704.1 through 704.m to other virtual loudspeakers 602.1 through 602.k within the virtual venue 600 to construct the dynamic audio presentation 800 without departing from the spirit and scope of the present disclosure.

After assigning the audio sounds 704.1 through 704.m to the virtual loudspeakers 602.1 through 602.k, the audio re-mixing tool can perform simple spatial movements of the audio sounds 704.1 through 704.m within the three-dimensional space of the virtual venue 600 in accordance with the one or more characteristics, parameters, and/or attributes of the audio sounds 704.1 through 704.m. As described herein, the audio re-mixing tool can access the one or more characteristics, parameters, and/or attributes of the audio sounds 704.1 through 704.m, such as spatial movement of the simple musical instruments and/or the collection of musical instruments that generated the audio sounds 704.1 through 704.m to provide an example. Alternatively, or in addition to, the audio re-mixing tool can analyze the audio sounds 704.1 through 704.m, for example, the audio sound 704.m that is generated by the snare drum as illustrated in FIG. 8A, to identify the one or more characteristics, parameters, and/or attributes of the audio sounds 704.1 through 704.m in a substantially similar manner as described herein.

In the exemplary embodiment illustrated in FIG. 8A, the one or more characteristics, parameters, and/or attributes of the audio sounds 704.1 through 704.m can indicate the audio re-mixing tool is to perform a simple spatial movement 810 within the three-dimensional space of the virtual venue 600. In some embodiments, the simple spatial movement 810 can include, for example, a spatial movement the audio sound 704.m that is generated by the snare drum within the three-dimensional space of the virtual venue 600 from the virtual loudspeakers 606.1 through 606.z to the effects extensions virtual array real-world loudspeaker system 608.1 through 608.l. In some embodiments, the one or more characteristics, parameters, and/or attributes of the audio sounds 704.1 through 704.m can identify a time $t_{move}$ that the audio sound 704.m that is generated by the snare drum is to move from the virtual loudspeakers 606.1 through 606.z to the effects extensions virtual array real-world loudspeaker system 608.1 through 608.l. Those skilled in the relevant art(s) will recognize that the simple spatial movement 810 from the virtual loudspeakers 606.1 through 606.z to the effects extensions virtual array real-world loudspeaker system 608.1 through 608.l as illustrated in FIG. 8A is for illustrative purposes and are not intended to be limiting. Those skilled in the relevant art(s) will recognize that the audio re-mixing tool can perform other simple spatial movements on other audio sounds from among the audio sounds 704.1 through 704.m in a substantially similar manner as the simple spatial movement 810 without departing from the spirit and scope of the present disclosure.

In some embodiments, the simple spatial movement 810 can represent an instantaneous, or near-instantaneous, spatial movement, also referred to as snap spatial movement, within the three-dimensional space of the virtual venue 600 from the virtual loudspeakers 606.1 through 606.z to the effects extensions virtual array real-world loudspeaker system 608.1 through 608.l at the time $t_{move}$. Alternatively, or in addition to, the simple spatial movement 810 can represent a gradual spatial movement within the three-dimensional space of the virtual venue 600 from the virtual loudspeakers 606.1 through 606.z to the effects extensions virtual array real-world loudspeaker system 608.1 then the snap spatial movement to the effects extensions virtual array real-world loudspeaker system 608.1 through 608.l. In some embodiments, the snap spatial movement can occur in response to an event, such as during a period of time where the snare drum does not generate audio sound, also referred to as a gap, within the audio sound 704.m to provide an example. For example, the snap spatial movement can be an instantaneous snap between virtual loudspeakers. As another example, the snap spatial movement can be a slow gradual snap away from the virtual loudspeakers.

FIG. 8B graphically illustrates a complex spatial movement operation 820 that can be performed by the audio re-mixing tool to assign an audio sound that is generated by a simple musical instrument, such as a percussion instrument, a wind instrument, a string instrument, and/or an electronic instrument, and/or a collection of musical instruments, such as musical instruments from the same classification of musical instruments, such as percussion instruments, wind instruments, string instruments, and/or electronic instruments to provide some examples and/or from different classifications of musical instruments, to the virtual loudspeakers 602.1 through 602.$k$ within the virtual venue 600. As described herein, the audio re-mixing tool can isolate the attack transients from among the audio sounds 704.1 through 704.$m$ and the decay transients from among the audio sounds 704.1 through 704.$m$ in a substantially similar manner as described herein.

As illustrated in FIG. 8B, the audio re-mixing tool can isolate the attack transients from among the audio sound 704.$m$ that are generated by the snare drum, referred to as the attack transient audio sound 752 in FIG. 8A, and the decay transients from among the audio sound 704.$m$ that are generated by the snare drum, referred to as the decay transient audio sound 754 in FIG. 8A, in a substantially similar manner as described herein. After isolating the attack transients and the decay transients, the audio re-mixing tool can identify an attack-decay real-world loudspeaker pairing from among the virtual loudspeakers 602.1 through 602.$k$ within the virtual venue 600 in a substantially similar manner as described herein. In the exemplary embodiment illustrated in FIG. 8B, the audio re-mixing tool can assign the attack transients that are generated by the simple musical instrument and/or the collection of musical instruments, such as the attack transient audio sound 752, to the virtual loudspeaker 756 from among the virtual loudspeakers 606.1 through 606.$z$ and the audio re-mixing tool can similarly assign the decay transients that are generated by the simple musical instrument and/or the collection of musical instruments, such as the decay transient audio sound 754, to the virtual loudspeaker 756 from among the virtual loudspeakers 606.1 through 606.$z$. Although the attack audio sounds and the decay audio sounds that are generated by the simple musical instrument and/or the collection of musical instruments are described as being assigned to the virtual loudspeaker 756 in FIG. 8B, those skilled in the relevant art(s) will recognize that the attack audio sounds and/or the decay audio sounds can be assigned to any of the virtual loudspeakers 602.1 through 602.$k$ within the virtual venue 600 in a substantially similar manner as described in FIG. 8B without departing from the sprit and scope of the present disclosure.

After assigning the attack audio sounds and the decay audio sounds, the audio re-mixing tool can perform complex spatial movements of the audio sounds 704.1 through 704.$m$ within the three-dimensional space of the virtual venue 600 in accordance with the one or more characteristics, parameters, and/or attributes of the audio sounds 704.1 through 704.$m$. As described herein, the audio re-mixing tool can access the one or more characteristics, parameters, and/or attributes of the audio sounds 704.1 through 704.$m$, such as spatial movement of the simple musical instruments and/or the collection of musical instruments that generated the audio sounds 704.1 through 704.$m$ to provide an example. Alternatively, or in addition to, the audio re-mixing tool can analyze the audio sounds 704.1 through 704.$m$, for example, the audio sound 704.$m$ that is generated by the snare drum as illustrated in FIG. 8A, to identify the one or more characteristics, parameters, and/or attributes of the audio sounds 704.1 through 704.$m$ in a substantially similar manner as described herein.

In the exemplary embodiment illustrated in FIG. 8B, the one or more characteristics, parameters, and/or attributes of the audio sounds 704.1 through 704.$m$ can indicate the audio re-mixing tool is to perform a complex spatial movement 820 within the three-dimensional space of the virtual venue 600. In some embodiments, the complex spatial movement 820 can include, for example, a simple spatial movement 812 of the attack transient audio sound 752 that is generated by the snare drum within the three-dimensional space of the virtual venue 600 from the virtual loudspeakers 606.1 through 606.$z$ to the effects extensions virtual array real-world loudspeaker system 608.1 through 608.$l$ and a simple spatial movement 814 of the attack transient audio sound 752 that is generated by the snare drum within the three-dimensional space of the virtual venue 600 from the virtual loudspeakers 606.1 through 606.$z$ to the effects extensions virtual array real-world loudspeaker system 608.1 through 608.$l$. Those skilled in the relevant art(s) will recognize that the complex spatial movement 820 from the virtual loudspeakers 606.1 through 606.$z$ to the effects extensions virtual array real-world loudspeaker system 608.1 as illustrated in FIG. 8B is for illustrative purposes and are not intended to be limiting. Those skilled in the relevant art(s) will recognize that the audio re-mixing tool can perform other simple spatial movements on other audio sound from among the audio sounds 704.1 through 704.$m$ in a substantially similar manner as the complex spatial movement 820 without departing from the spirit and scope of the present disclosure. In some embodiments, the simple spatial movement 812 and/or the simple spatial movement 814 can be performed in a substantially similar manner as described herein. In these embodiments, the simple spatial movement 812 can be performed before, contemporaneous, or after the simple spatial movement 814.

Exemplary Configuring the Exemplary Real-World Venue to Implement the Exemplary Audio Presentations FIG. 9 graphically illustrates a high-level pictorial mapping of the exemplary virtual venue to the exemplary real-world venue in accordance with some exemplary embodiments of the present disclosure. In the exemplary embodiment illustrated in FIG. 9, an audio re-mixing tool, such as the audio re-mixing tool 154, can assign the audio sounds, such as the audio sounds 156.1 through 156.$n$, to the virtual loudspeakers 602.1 through 602.$k$ within the virtual venue 600 to construct an audio presentation, such as the static audio presentation 700 and/or the dynamic audio presentation 800, to playback the composite audio program within a real-world venue, such as the real-world venue 102. As described herein, the audio re-mixing tool can configure the real-world venue as outlined in the audio presentation to playback the composite audio program within the real-world venue.

As illustrated in FIG. 9, the audio re-mixing tool can assign the audio sounds to the virtual loudspeakers 602.1 through 602.$k$ within the three-dimensional space of the virtual venue 600 in a substantially similar manner as described herein to construct the audio presentation. In some embodiments, the real-world venue can include audio equipment, such as amplifiers, crossovers, equalizers, and/or mixers, to route and/or to signal condition the audio sounds for playback within the real-world venue. In these embodiments, the audio re-mixing tool 154 can generate audio control signals, such as the audio control signals 158.1 through 158.$i$, to configure the audio equipment within the real-world venue to playback the audio presentation on the real-world loudspeakers within the real-world venue. In these embodiments, the audio control signals can cause the audio equipment of the real-world venue to route and/or to signal condition the audio sounds for playback through the real-world loudspeakers within the real-world venue as outlined in the audio presentation.

As illustrated in FIG. 9, the audio re-mixing tool can access real-world venue configuration information 902 to generate the audio control signals, such as the audio control signals 158.1 through 158.*i*, to configure the audio equipment within the real-world venue to playback the audio presentation on the real-world loudspeakers within the real-world venue. In some embodiments, the real-world venue configuration information 902 are represent an organized collection of data, often referred to as a database. The database may include one or more data tables having data values, such as alphanumeric strings, integers, decimals, floating points, dates, times, binary values, Boolean values, and/or enumerations to provide some examples. The database can be a columnar database, a relational database, a key-store database, a graph database, and/or a document store to provide some examples. In some embodiments, the real-world venue configuration information 902 can include real-world loudspeaker configuration information 904.1 through 904.*k* corresponding to the virtual loudspeakers 602.1 through 602.*k* that are situated within the three-dimensional space of the virtual venue 600. In some embodiments, the audio re-mixing tool can access the real-world loudspeaker information 904.1 through 904.*k* to generate audio control signals to playback the audio sounds that have been assigned to the virtual loudspeakers 602.1 through 602.*k* on the real-world loudspeakers within the real-world venue. In these embodiments, the audio re-mixing tool can access the real-world loudspeaker information 904.1 to generate audio control signals to playback the audio sounds that have been assigned to the virtual loudspeaker 602.1 on real-world loudspeakers within the real-world venue that are associated with the virtual loudspeaker 602.1, the real-world loudspeaker information 904.2 to generate audio control signals to playback the audio sounds that have been assigned to the virtual loudspeaker 602.2 on real-world loudspeakers within the real-world venue that are associated with the virtual loudspeaker 602.2, the real-world loudspeaker information 904.3 to generate audio control signals to playback the audio sounds that have been assigned to the virtual loudspeaker 602.3 on real-world loudspeakers within the real-world venue that are associated with the virtual loudspeaker 602.3, and the real-world loudspeaker information 904.*k* to generate audio control signals to playback the audio sounds that have been assigned to the virtual loudspeaker 602.*k* on real-world loudspeakers within the real-world venue that are associated with the virtual loudspeaker 602.*k*.
Exemplary Operations of the Exemplary Audio Re-Mixing Tool FIG. 10 illustrates a flowchart of the exemplary audio re-mixing tool in accordance with some exemplary embodiments of the present disclosure. The disclosure is not limited to this operational description. Rather, it will be apparent to ordinary persons skilled in the relevant art(s) that other operational control flows are within the scope and spirit of the present disclosure. The following discussion describes an operational control flow 1000 to intelligently construct an audio presentation to playback a composite audio program, such as the composite audio program 150, within a real-world venue, such as the real-world venue 102. The operational control flow 1000 can be performed by, for example, the audio re-mixing tool 154. In some embodiments, the operational control flow 1000 can be executed by one or more computing devices, such as the audio playback server 104.

At operation 1002, the operational control flow 1000 constructs the audio presentation to playback the composite audio program within the real-world venue. The operational control flow 1000 can utilize the software re-mixing toolkit to construct the audio presentation in a substantially similar manner as described herein.

At operation 1004, the operational control flow 1000 can configure the real-world venue as outlined in the audio presentation to playback the composite audio program within the real-world venue. The operational control flow 1000 can identify the audio control signals, such as the audio control signals 158.1 through 158.*i*, that configure the real-world venue to playback the audio presentation through real-world loudspeakers within the real-world venue to playback the composite audio program within the real-world venue in a substantially similar manner as described herein.
Exemplary Computing Device that can be Utilized to Implement Electronic Devices within the Exemplary Real-World Venue FIG. 11 graphically illustrates a simplified block diagram of a computing device that can be utilized to implement electronic devices within the exemplary real-world venue according to some embodiments of the present disclosure. The discussion of FIG. 11 to follow is to describe a computing device 1100 that can be used to implement the audio playback server 104.

In the embodiment illustrated in FIG. 11, the computing device 1100 includes one or more processors 1102. In some embodiments, the one or more processors 1102 can include, or can be, any of a microprocessor, graphics processing unit, or digital signal processor, and their electronic processing equivalents, such as an Application Specific Integrated Circuit ("ASIC") or Field Programmable Gate Array ("FPGA"). As used herein, the term "processor" signifies a tangible data and information processing device that physically transforms data and information, typically using a sequence transformation (also referred to as "operations"). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi-processor arrays, including graphic processing units, digital signal processors, digital processors or combinations of these elements. The processor can be electronic, for example, comprising digital logic circuitry (for example, binary logic), or analog (for example, an operational amplifier). The processor may also operate to support performance of the relevant operations in a "cloud computing" environment or as a "software as a service" (SaaS). For example, at least some of the operations may be performed by a collection of processors available at a distributed or remote system, these processors accessible via a communications network (e.g., the Internet) and via one or more software interfaces (e.g., an application program interface (API).) In some embodiments, the computing device 1100 can include an operating system, such as Microsoft's Windows, Sun Microsystems's Solaris, Apple Computer's MacOs, Linux or UNIX. In some embodiments, the computing device 1100 can also include a Basic Input/Output System (BIOS) and processor firmware. The operating system, BIOS and firmware are used by the one or more processors 1102 to control subsystems and interfaces coupled to the one or more processors 1102. In some embodiments, the one or more processors 1102 can include the Pentium and Itanium from Intel, the Opteron and Athlon from Advanced Micro Devices, and the ARM processor from ARM Holdings.

As illustrated in FIG. 11, the computing device 1100 can include a machine-readable medium 1104. In some embodiments, the machine-readable medium 1104 can further include a main random-access memory ("RAM") 1106, a read only memory ("ROM") 1108, and/or a file storage subsystem 1110. The RAM 730 can store instructions and data during program execution and the ROM 732 can store fixed instructions. The file storage subsystem 1110 provides persistent storage for program and data files, and may include a hard disk drive, a floppy disk drive along with associated removable media, a CD-ROM drive, an optical drive, a flash memory, or removable media cartridges.

The computing device 1100 can further include user interface input devices 1112 and user interface output devices 1114. The user interface input devices 1112 can include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices to provide some examples. The user interface input devices 1112 can be connected by wire or wirelessly to the computing device 1100. Generally, the user interface input devices 1112 are intended to include all possible types of devices and ways to input information into the computing device 1100. The user interface input devices 1112 typically allow a user to identify objects, icons, text and the like that appear on some types of user interface output devices, for example, a display subsystem. The user interface output devices 1120 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as vian audio output or tactile output (e.g., vibrations) devices. Generally, the user interface output devices 1120 are intended to include all possible types of devices and ways to output information from the computing device 1100.

The computing device 1100 can further include a network interface 1116 to provide an interface to outside networks, including an interface to a communication network 1118, and is coupled via the communication network 1118 to corresponding interface devices in other computing devices or machines. The communication network 1118 may comprise many interconnected computing devices, machines and communication links. These communication links may be wired links, optical links, wireless links, or any other devices for communication of information. The communication network 1118 can be any suitable computer network, for example a wide area network such as the Internet, and/or a local area network such as Ethernet. The communication network 1118 can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

As illustrated in FIG. 11, the one or more processors 1102, the machine-readable medium 1104, the user interface input devices 1112, the user interface output devices 1114, and/or the network interface 1116 can be communicatively coupled to one another using a bus subsystem 1120. Although the bus subsystem 1120 is shown schematically as a single bus, alternative embodiments of the bus subsystem may use busses. For example, RAM-based main memory can communicate directly with file storage systems using Direct Memory Access ("DMA") systems.

CONCLUSION

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software application, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software application, routines, instructions can be described herein as performing certain actions. However, it should be appreciated that such descriptions are merely for convenience and that such actions in fact result from computing devices, processors, controllers, or other devices executing the firmware, software application, routines, instructions, etc.

The Detailed Description of the exemplary embodiments fully revealed the general nature of the disclosure that others can, by applying knowledge of those skilled in relevant art(s), readily modify and/or adapt for applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. An audio playback server for re-mixing a plurality of audio sounds of a composite audio program for playback within a real-world venue, the audio playback server comprising:

a memory configured to store an audio re-mixing tool; and a processor configured to execute the audio re-mixing tool, the audio re-mixing tool, when executed by the processor, configuring the processor to:

access a virtual venue that corresponds to the real-world venue, the virtual venue including a plurality of virtual loudspeakers corresponding to a plurality of real-world loudspeakers within the real-world venue, access an ensemble bounding volume outlining a maximum spatial distance between a first audio sound and a second audio sound of an audio sound ensemble from among the plurality of audio sounds, assign the first audio sound to a first virtual loudspeaker from among the plurality of virtual loudspeakers, assign the second audio sound to a second virtual loudspeaker from among the plurality of virtual loudspeakers that is situated less than the maximum spatial distance from the first audio sound, and identify a plurality of audio control signals within the real-world venue to configure the real-world venue to playback the first audio sound at a first real-world loudspeaker from among the plurality of real-world loudspeakers that corresponds to the first virtual loudspeaker and the second audio sound at a second real-world loudspeaker from among the plurality of real-world loudspeakers that corresponds to the second virtual loudspeaker.

2. The audio playback server of claim 1, wherein the audio re-mixing tool, when executed by the processor, further configures the processor to access an electronic library of audio sounds having the plurality of audio sounds that have been deconstructed from the composite audio program.

3. The audio playback server of claim 1, wherein the audio re-mixing tool, when executed by the processor, further configures the processor to:

logically group the first audio sound and the second audio sound to form the audio sound ensemble;

position the first audio sound and the second audio sound at a spatial distance within the ensemble bounding volume;

determine an audible flight time for the first audio sound and the second audio sound to arrive at a location within the virtual venue; and wherein the audio re-mixing tool, when executed by the processor, further configures the processor to iteratively position the first audio sound and the second audio sound and iteratively determine the audible flight time to form the ensemble bounding volume, and wherein for each iteration, the audio re-mixing tool, when executed by the processor, further configures the processor to adjust the spatial distance until a difference between the audible flight time becomes greater than an audible flight time threshold to determine the maximum spatial distance.

4. The audio playback server of claim 1, wherein the audio re-mixing tool, when executed by the processor, further configures the processor to move the second audio sound from the second virtual loudspeaker to a third virtual loudspeaker that is situated less than the maximum spatial distance from the first audio sound during the composite audio program.

5. The audio playback server of claim 4, wherein the movement of the second audio sound from the second virtual loudspeaker to the third virtual loudspeaker comprises a snap spatial movement of the second audio sound.

6. The audio playback server of claim 1, wherein the audio re-mixing tool, when executed by the processor, further configures the processor to:

isolate an attack transient of the first audio sound and a decay transient of the first audio sound from the first audio sound; and assign the attack transient of the first audio sound to the first virtual loudspeaker and the decay transient of the first audio sound to a third virtual loudspeaker from among the plurality of virtual loudspeakers that is situated less than the maximum spatial distance from the first audio sound.

7. The audio playback server of claim 6, wherein the audio re-mixing tool, when executed by the processor, further configures the processor to:

move the attack transient of the first audio sound from the first virtual loudspeaker to a fourth virtual loudspeaker that is situated less than the maximum spatial distance from the first audio sound during the composite audio program; or move the decay transient of the first audio sound from the third virtual loudspeaker to the fourth virtual loudspeaker during the composite audio program.

8. A method for re-mixing a plurality of audio sounds of a composite audio program for playback within a real-world venue, the method comprising:

accessing, by a computing device, a virtual venue that corresponds to the real-world venue, the virtual venue including a plurality of virtual loudspeakers corresponding to a plurality of real-world loudspeakers within the real-world venue;

accessing, by the computing device, an ensemble bounding volume outlining a maximum spatial distance between a first audio sound and a second audio sound of an audio sound ensemble from among the plurality of audio sounds;

assigning, by the computing device, the first audio sound to a first virtual loudspeaker from among the plurality of virtual loudspeakers;

assigning, by the computing device, the second audio sound to a second virtual loudspeaker from among the plurality of virtual loudspeakers that is situated less than the maximum spatial distance from the first audio sound; and identifying, by the computing device, a plurality of audio control signals within the real-world venue to configure the real-world venue to playback the first audio sound at a first real-world loudspeaker from among the plurality of real-world loudspeakers that corresponds to the first virtual loudspeaker and the second audio sound at a second real-world loudspeaker from among the plurality of real-world loudspeakers that corresponds to the second virtual loudspeaker.

9. The method of claim 8, further comprising accessing, by the computing device, an electronic library of audio sounds having the plurality of audio sounds that have been deconstructed from the composite audio program.

10. The method of claim 8, further comprising:

logically grouping, by the computing device, the first audio sound and the second audio sound to form the audio sound ensemble;

positioning, by the computing device, the first audio sound and the second audio sound at a spatial distance within the ensemble bounding volume;

determining, by the computing device, an audible flight time for the first audio sound and the second audio sound to arrive at a location within the virtual venue; and iteratively repeating the positioning and determining the audible flight time to form the ensemble bounding volume, wherein for each iteration, the spatial distance is adjusted until a difference between the audible flight time becomes greater than an audible flight time threshold to determine the maximum spatial distance.

11. The method of claim 8, further comprising moving, by the computing device, the second audio sound from the second virtual loudspeaker to a third virtual loudspeaker that is less than the maximum spatial distance from the first audio sound during the composite audio program.

12. The method of claim 11, wherein the movement of the second audio sound from the second virtual loudspeaker to the third virtual loudspeaker comprises a snap spatial movement of the second audio sound.

13. The method of claim 8, further comprising:

isolating, by the computing device, an attack transient of the first audio sound and a decay transient of the first audio sound from the first audio sound; and assigning, by the computing device, the attack transient of the first audio sound to the first virtual loudspeaker and the decay transient of the first audio sound to a third virtual loudspeaker from among the plurality of virtual loudspeakers that is less than the maximum spatial distance from the first audio sound.

14. The method of claim 13, further comprising:

moving, by the computing device, the attack transient of the first audio sound from the first virtual loudspeaker to a fourth virtual loudspeaker that is less than the maximum spatial distance from the first audio sound during the composite audio program; or moving, by the computing device, the decay transient of the first audio sound from the third virtual loudspeaker to the fourth virtual loudspeaker during the composite audio program.

15. A real-world venue for playing back a composite audio program, the real-world venue comprising:

a plurality of real-world loudspeakers within the real-world venue configured to playback a plurality of audio sounds of the composite audio program; and an audio playback server configured to:

access a virtual venue that corresponds to the real-world venue, the virtual venue including a plurality of virtual loudspeakers corresponding to the plurality of real-world loudspeakers, access an ensemble bounding volume outlining a maximum spatial distance between a first audio sound and a second audio sound of an audio sound ensemble from among the plurality of audio sounds, assign the first audio sound to a first virtual loudspeaker from among the plurality of virtual loudspeakers, assign the second audio sound to a second virtual loudspeaker from among the plurality of virtual loudspeakers that is less than the maximum spatial distance from the first audio sound, and identify a plurality of audio control signals within the real-world venue to configure the real-world venue to playback the first audio sound at a first real-world loudspeaker from among the plurality of real-world loudspeakers that corresponds to the first virtual loudspeaker and the second audio sound at a second real-world loudspeaker from among the plurality of real-world loudspeakers that corresponds to the second virtual loudspeaker.

16. The real-world venue of claim 15, wherein the audio playback server is further configured to access an electronic library of audio sounds having the plurality of audio sounds that have been deconstructed from the composite audio program.

17. The real-world venue of claim 15, wherein the audio playback server is further configured to:

logically group the first audio sound and the second audio sound to form the audio sound ensemble;

position the first audio sound and the second audio sound at the spatial distance within the ensemble bounding volume;

determine an audible flight time for the first audio sound and the second audio sound to arrive at a location within the virtual venue, wherein the audio playback server is further configured to iteratively position the first audio sound and the second audio sound and iteratively determine the audible flight time to form the ensemble bounding volume, and wherein for each iteration, the audio playback server is further configured to adjust the spatial distance until a difference between the audible flight time becomes greater than an audible flight time threshold to determine the maximum spatial distance.

18. The real-world venue of claim 15, wherein the audio playback server is further configured to move the second audio sound from the second virtual loudspeaker to a third virtual loudspeaker that is situated less than the maximum spatial distance from the first audio sound during the composite audio program.

19. The real-world venue of claim 18, wherein the movement of the second audio sound from the second virtual loudspeaker to the third virtual loudspeaker comprises a snap spatial movement of the second audio sound.

20. The real-world venue of claim 15, wherein the audio playback server is further configured to:

isolate an attack transient of the first audio sound and a decay transient of the first audio sound from the first audio sound;

assign the attack transient of the first audio sound to the first virtual loudspeaker and the decay transient of the first audio sound to a third virtual loudspeaker from among the plurality of virtual loudspeakers that is situated less than the maximum spatial distance from the first audio sound;

move the attack transient of the first audio sound from the first virtual loudspeaker to a fourth virtual loudspeaker that is situated less than the maximum spatial distance from the first audio sound during the composite audio program; or move the decay transient of the first audio sound from the third virtual loudspeaker to the fourth virtual loudspeaker during the composite audio program.

* * * * *